US011689903B2

(12) United States Patent
Nguyen

(10) Patent No.: US 11,689,903 B2
(45) Date of Patent: Jun. 27, 2023

(54) SYSTEM AND METHOD FOR VEHICULAR DATA COMMUNICATION

(71) Applicant: NEC Corporation, Tokyo (JP)

(72) Inventor: Phong Nguyen, Victoria (AU)

(73) Assignee: NEC CORPORATION, Tokyo (JP)

( * ) Notice: Subject to any disclaimer, the term of this patent is extended or adjusted under 35 U.S.C. 154(b) by 45 days.

(21) Appl. No.: 17/267,126

(22) PCT Filed: May 29, 2019

(86) PCT No.: PCT/JP2019/021269
§ 371 (c)(1),
(2) Date: Feb. 9, 2021

(87) PCT Pub. No.: WO2020/035983
PCT Pub. Date: Feb. 20, 2020

(65) Prior Publication Data
US 2021/0314750 A1    Oct. 7, 2021

(30) Foreign Application Priority Data
Aug. 17, 2018  (AU) ................................ 2018903021

(51) Int. Cl.
*H04W 4/40* (2018.01)
*H04W 76/10* (2018.01)
(Continued)

(52) U.S. Cl.
CPC ............... *H04W 4/40* (2018.02); *G08G 1/22* (2013.01); *H04W 72/20* (2023.01); *H04W 76/10* (2018.02); *H04L 5/0048* (2013.01)

(58) Field of Classification Search
CPC ... H04W 4/40; H04W 72/1278; H04W 76/10; H04W 4/46; H04W 72/1242; G08G 1/22; H04L 5/0048
(Continued)

(56) References Cited

U.S. PATENT DOCUMENTS

2018/0365993 A1* 12/2018 Makke .............. G08G 1/096791
2019/0182639 A1*  6/2019 Basu Mallick ......... H04W 4/40
(Continued)

FOREIGN PATENT DOCUMENTS

CA      3 036 351 A1   10/2017
WO   2017/030338 A1    2/2017

OTHER PUBLICATIONS

International Search Report for PCT Application No. PCT/JP2019/021269, dated Oct. 21, 2019.
(Continued)

*Primary Examiner* — Hirdepal Singh
(74) *Attorney, Agent, or Firm* — Sughrue Mion, PLLC

(57) ABSTRACT

The present disclosure relates to a method of configuring an integrated resource pool for use in an advanced wireless communication system such as 5G (the Fifth Generation) system. The method comprises configuring a first logical resource pool dedicated for V2X sidelink communication, or open loop communication, in sharing driving related application data including but not being limited to status data, sensor data, and intention data. Further, the method comprises configuring a second logical resource pool dedicated for V2X sidelink communication, or closed-loop communication, in sharing time-sensitive coordination data and/or exchanging time-sensitive coordination data in short distance grouping such as synchronised coordination driving and long distance grouping such as platooning. The method further comprises configuring one primary set of resources and one or more secondary sets of resources from the second logical resource pool for secured intra-platoon communications.

5 Claims, 12 Drawing Sheets

(51) Int. Cl.
*G08G 1/00* (2006.01)
*H04W 72/20* (2023.01)
*H04L 5/00* (2006.01)

(58) Field of Classification Search
USPC .......................................................... 455/450
See application file for complete search history.

(56) References Cited

U.S. PATENT DOCUMENTS

| | | | |
|---|---|---|---|
| 2019/0239112 A1* | 8/2019 | Rao | H04W 4/70 |
| 2021/0212023 A1* | 7/2021 | Zeng | H04W 72/0446 |
| 2021/0219187 A1* | 7/2021 | Lee | H04W 72/0446 |
| 2022/0039080 A1* | 2/2022 | Khoryaev | H04W 4/40 |

OTHER PUBLICATIONS

Written opinion for PCT Application No. PCT/JP2019/021269, dated Oct. 21, 2019.
3GPP TR 22.886—3rd Generation Partnership Project; Technical Specification Group Services and System Aspects; Study on enhancement of 3GPP support for 5G V2X Services (Release 15) V15.2.0 Jun. 2018.
3GPP TR 38.885—3rd Generation Partnership Project; Technical Specification Group Radio Access Network; NR; Study on Vehicle-to-Everything (Release 16)—WID/SID: 181480 V0.0.0 Aug. 2018.
Ericsson, "Chairman's Notes of AI 7.4", R1-1801131, 3GPP TSG RAN WG1 Meeting AH 1801, Vancouver, Canada, Jan. 22-26, 2018.
ANSI/IEEE Std 802.11, 1999 Edition (R2003), Information technology—Telecommunications and information exchange between systems—Local and metropolitan area networks—Specific requirements—Part 11: Wireless LAN Medium Access Control (MAC) and Physical Layer (PHY) specifications.
Yang Zheng, Shengbo Eben Li, Keqiang Li, and Wei Ren, 'Platooning of connected vehicles with undirected topologies: Robustness analysis and distributed H-infinity controller synthesis', Jul. 16, 2017.
Steven E. Shladover et al., Automatic Vehicle Control Developments in the PATH program, IEEE transactions on vehicular technology, vol. 40, No. 1, Feb. 1991.
The Car-2-Car Communication Consortium Roadmaps beyond Day-1, Mar. 10, 2016.

* cited by examiner

SYSTEM AND METHOD FOR VEHICULAR DATA COMMUNICATION

This application is a National Stage Entry of PCT/JP2019/021269 filed on May 29, 2019, which claims priority from Australian Patent Application 2018903021 filed on Aug. 17, 2018, the contents of all of which are incorporated herein by reference, in their entirety.

TECHNICAL FIELD

The present invention relates generally to vehicular data communication techniques for use in an advanced wireless communication system such as 3GPP 5G, assisting the realisation of SAE's automated driving applications. In particular, the present invention relates to methods in configuring the integrated resource pool for all V2X communications, using physical layer assisting the realisation of low and guaranteed latency 'ask-response' protocol, and providing secured intra-platoon

BACKGROUND ART

| Abbreviation: | |
|---|---|
| 3GPP | 3$^{rd}$ Generation Partnership Project |
| 4G | 4th generation |
| 5G | 5th generation |
| c-V2X | Critical V2X or Critical vehicular communication |
| DMRS | Demodulation Reference Signal |
| eV2X | Enhanced V2X |
| IEEE | Institute of Electrical and Electronics Engineers |
| LIDAR | Light Detection And Ranging |
| LTE | Long term evolution |
| LTE-A | Advanced LTE or 4G |
| LTE-A Pro | LTE Advanced Pro. 3GPP LTE Release 13 and 14; In layman's term it may be called 4.5G, 4.5G Pro, 4.9G |
| LTE-SL | LTE sidelink communication |
| NR | New Radio |
| OBD or OBU | On-board Device or On-board Unit |
| PC5 | D2D interface or LTE-V2X |
| PSCCH | Physical sidelink control channel |
| PSSCH | Physical sidelink shared channel |
| RSU | Road side Unit |
| SAE | Society of Automotive Engineers |
| SCI | Sidelink control information |
| SL | Sidelink |
| SPS | Semi persistent scheduling |
| URLLC | Ultra-reliable-low latency communications |
| V2I | Vehicle to Infrastructure |
| V2P | Vehicle to Pedestrian |
| V2V | Vehicle to Vehicle |
| V2X | Vehicle to Everything |
| V2X-Vehicle | V2X-equipped vehicles or Vehicle equipped with V2X-OBD |
| VANET | Vehicular ad hoc networks |
| WAVE | Wireless Access in Vehicular Environments |

The reference to any prior art in this specification is not, and should not be taken as an acknowledgement or any form of suggestion that the prior art forms part of the common general knowledge.

V2X or so-called Vehicle-to-Everything communications encapsulates a truly Connected Vehicle able to communicate with: other vehicles (i.e. V2V, covering communication between vehicles); infrastructures (i.e. V2I, covering communication between a vehicle and a roadside unit/network) such as traffic lights, toll gates; pedestrians (i.e. V2P, covering communication between a vehicle and a device carried by an individual); and even the owner's home (i.e. V2H, covering communication between a vehicle and a home device). V2X may be the answer to traffic management authority and automotive sectors, for optimised traffic & traffic flow; traffic control; incidents management; accidents prevention; safe, clean and ultimately autonomous/automated/self-driving vehicles.

In regard to automated driving, the SAE (Society of Automotive Engineers) defines 6 levels of automation from level 0 to level 5 for on road vehicles as guideline for automated driving applications development. According to SAE's driving automation:

at level 0 (no automation), the human driver performs all operating & dynamic driving tasks even when enhanced by warning or intervention system;

at level 1 (driver assistance), the vehicle driving system can assist with some functions such as acceleration/deceleration/braking or steering using information about the driving environment, but the human driver handles all dynamic driving tasks and all monitoring of the environment;

at level 2 (partial automation), the vehicle driving system can assist with steering and acceleration/deceleration functions using information about the driving environment and allows the human driver to disengage from some of their tasks. The human driver must always be ready to take control of the vehicle and it still responsible for most safety-critical functions and all monitoring of the environment;

at level 3 (conditional automation), the vehicle driving system controls all monitoring of the environment and all aspect of dynamic driving tasks, and allows the human driver disengage from safety critical functions, with the expectation that the human driver will respond appropriately to a request to intervene;

at level 4 (high automation), the vehicle driving system controls all monitoring of the environment and all aspect of dynamic driving tasks as well as responding to events, making decisions and taking action event if the human driver does not respond appropriately to a request to intervene.

At level 4, the vehicle autonomous driving system would first notify the human driver when conditions are safe, and only then does the human driver switch the vehicle into this mode; and at level 5, the vehicle driving system controls all monitoring of the environment and all aspect of dynamic driving tasks under all roadway and environmental conditions that can be managed by a human driver.

Achieving automated driving SAE's level 4 and level 5 shall require critical vehicular communication namely c-V2X (i.e. critical-V2X) which can deliver ultra-reliable and ultra-low latency V2V, V2I, and V2P platform for vehicle driving system to exchange time-critical application-layer messages with and without network coverage. Due to the lack of critical vehicular communication technologies (i.e. c-V2X), most automakers are currently developing vehicles at SAE's level 2, and some automakers has made some progress in R&D of vehicles at SAE's level 3 relying on local sensors such as LiDAR and cameras for monitoring the local driving environment. In both cases vehicular communication technologies, such as IEEE 802.11a in DSRC and IEEE 802.11p in WAVE or VANET, and cellular LTE, are mainly used or potentially used for sharing status data, sensor data, and intention data (in limited cases) among any V2X-equipped vehicles (i.e. V2X-Vehicles), providing the vehicle driving system and the human drivers, a global view of driving environment/traffic and alert to the most common causes of accidents in time to take evasive action. In the latter case with more advanced driving applications and in restricted driving environment and conditions, some evasive actions can be initiated and performed automatically by the vehicle driving system in an attempt to realise 'conditional automation'.

As an alternative to IEEE802.11p based V2X communication, the 3rd Generation Partnership Project (3GPP) released the first version of V2X communications in LTE Rel'14 in December 2016, and the further enhanced version of LTE based V2X was released in the recent LTE-Rel'15. The IEEE802.11p is believed to encounter issues with reliability and network's scalability as the load increases. While the 3GPP LTE-V2X is believed to improve physical layer's link budget and under certain conditions increase reliability by adding retransmissions or redundancies. The rel'14/15 LTE-V2X standard includes 2 radio interfaces. The cellular interface (i.e. Uu) supports V2I communications, while the PC5 interfaces support direct V2V communications based on LTE-SL (slide link) mode 3 and mode 4 which were specifically designed for V2V communication. In both LTE-SL mode 3 (network assistance) and mode 4 (autonomous), a V2X-vehicle is configured by a cellular network or preconfigured with a logical resource pool comprising plurality of indexed time-frequency multiplexed sub-channels, where the logical resource pool for LTE-SL mode 3 operation is physically separated from the logical resource pool for LTE-SL mode 4 operation. In mode 3, the cellular network selects and manages the radio resources used by V2X-vehicles for their direct V2V communications. In mode 4, V2X-Vehicles autonomously select the radio resources or sub-channels for their direct V2V communications without any assistance from a cellular network and can operates outside network coverage, and is therefore considered as the most appropriate baseline technology so far for c-V2X.

In Rel'14/15 LTE-SL mode 4, a distributed scheduling scheme is utilised for V2X-Vehicles to select their radio resources. Upon the arrival of a packet for transmission, a V2X-Vehicle utilises sensing-based SPS scheme to establish one or two candidate lists of resources for further random selection of sub-channels in transmitting data packets and its redundancies. In the nominated selection window of 100 ms, 50 ms or 20 ms, the V2X-vehicle reserves the selected sub-channel(s) for a number of consecutive transmissions. On a current transmission, in the transmitted scheduling SCI (sidelink control information), the V2X-vehicle indicates the sub-channels that is/are reserved for a number of coming transmissions/retransmissions hence preventing future channel collisions. Additionally, In Rel'14/15 LTE-SL mode 4, an SCI transmitted on control channel (PSCCH) and data transmitted on the associated data channel (PSSCH) are broadcasted which are not intended to a particular V2X-vehicles within proximity and therefore a PSCCH and associated PSSCH transmitted by a V2X-vehicle are detectable and decodable by any V2X-vehicles with the transmission range. This transmission technique makes the Rel'14/15 LTE-SL mode 4 perfectly fit for open loop communication in sharing status data, sensor data, and driving intention data among V2X-Vehicles in the same area in the realisation of automated driving applications and should fulfil potential requirements for information sharing for partial/conditional automated driving/platooning at SAE level 3 and 2 Ref[1].

In 5G system, shorter symbol length, shorter slot length and improved reliability will be realised, the Rel'14/15 LTE-SL mode 4 technique can be reused for 5G-eV2X with confidence that lower application-layer end-to-end latency requirements open-loop communication in information sharing for high/full automated driving/platooning Ref[1] at SAE level 4 and 5 is met. Additionally, at automated driving SAE level 4/5, low & guaranteed closed-loop communication is required for V2X-vehicles to exchange time-sensitive application-layer messages in realising the synchronised cooperative driving, which allows a group of V2X-vehicles to automatically communicate to enable lane changing, merging, passing between V2X-vehicles of the group or overtaking, intersection coordination, dynamic platooning and etc. According to the Rel'14/15 LTE-SL mode 4 technique, the first V2X-vehicle and a second V2X-vehicle can exchange application-layer messages for time-sensitive decision making by independently selecting sub-channels and further reserves the selected sub-channels for their transmissions. Once transmitting an application-layer message which request further information from the second V2X-Vehicle, the first V2X-Vehicle has no knowledge when it will successfully receive response from the second V2X-vehicle because this depends on channel selection and reservation at the second V2X-Vehicle. Therefore, the reuse of Rel'14/15 LTE-SL mode 4 technique in for 5G-eV2X does not guarantee the low round trip latency in message exchange for time-sensitive decision making.

At SAE level 4 and 5, particularly in automated platooning application, communication among platoon members must be protected against potential security threads, and communication ranges of intra-platooning messages should be controlled for privacy considering resource-efficient distribution according to Ref [1]. If the 3GPP Rel'14/15 LTE technique is reused in 5G-eV2X and applied for intra-platooning communication, V2X-Vehicles in the platoon will individually and independently monitor the allocated resource pool, select sub-channels, and then reserve the selected sub-channels for a number of consecutive transmissions. As the result, the number of sub-channels being selected and reserved for transmission will grow with number of members in a platoon and number of co-existed platoons at a location. As aforementioned, in Rel'14/15 LTE-SL mode 4 technique, an SCI transmitted on control channel (PSCCH) and data transmitted on the associated data channel (PSSCH) are detectable and decodable by any V2X-vehicles with the transmission range, thus making the intra-platooning communication using Rel'14/15 LTE-SL mode 4 technique more vulnerable to privacy and security threats.

CITATION LIST

Non Patent Literature

NPL 1: TR 22.886—Study on enhancement of 3GPP support for 5G V2X Services (Release 15)
NPL 2: TR 38.885—Study on NR Vehicle-to-Everything (V2X) (Release 16)—WID/SID: 181480
NPL 3: 3GPP TSG RAN WG1 #91, RAN1_AH_1801, RAN1 Chairman's Notes
NPL 4: IEEE 802.11-2012, Part 11: Wireless LAN Medium Access Control (MAC) and Physical Layer (PHY) specifications, IEEE Std
NPL 5: 'Platooning of connected vehicles with undirected topologies: Robustness analysis and distributed H-infinity controller synthesis', Yang Zheng, Shengbo Eben Li, Keqiang Li, and Wei Ren; 16 Jul. 2017.

NPL 6: Automatic Vehicle Control Developments in the PATH program, IEEE transactions on vehicular technology, Vol 40, No 1, February 1991

NPL 7: The Car-2-Car Communication Consortium Roadmaps beyond Day-1, Oct. 3, 2016.

SUMMARY OF INVENTION

Technical Problem

It is foreseen that the V2X ecosystem in the near future will comprise the coexistence of communications for:

sharing status data for awareness driving application which tends to have wide transmission range;

sharing sensor data for sensing driving application which tends to occupy high system resources;

sharing intention data for automated cooperative driving which demands low end-to-end latency with high reliability;

exchanging coordination data for automated synchronised cooperative driving applications which demand very much lower latency for message exchanges in high to very high density environment; and highly secured intra-platoon communication with efficient resource utilization/distribution which tends to have short & controlled transmission range i.e. low transmit power making it vulnerable from other V2X communication and/or background traffic when sharing the same resource pool with other applications.

Providing separate resource pools for different driving applications may be a lean approach for ensure the quality of services for a driving application. However, this approach shall be inefficient and require more expensive design and development of V2X-devices as a V2X-device for the realisation of automated driving application required to access to multiple or all resources pools to obtain time-sensitive driving environment information. Thus, there is a need for resource pool design which is scalable and seamlessly support signal transmission and reception for currently defined driving applications as well as further defined driving applications.

Having discussed the potential and limitations of reusing Rel'14/15 LTE-SL mode 4 technique in 5G-eV2X for the realisation of automated driving applications with the vision on V2X ecosystem, the preferred embodiment will provide new or enhanced solutions on:

Integrated resource pool structure for V2X communication as a whole;

'channel reservation for reverse transmission' method for use in exchanging messages in time sensitive decision making where latency can be controlled for realising automated cooperative driving application;

Highly secured intra-platoon communication with manageable resource allocations.

Solution to Problem

According to one aspect of the present invention, there is provided a method of configuring an integrated resource pool for use in an advanced wireless communication system such as 5G (the Fifth Generation) system, the system comprising a plurality of vehicles having capabilities of including but not being limited to one or multiples of the following:

sharing status data, sensor data, and intention data for awareness driving, sensing driving and cooperative driving applications;

exchanging time-sensitive coordination data for synchronised cooperative driving; and establishing highly secured wireless communication for exchanging time-sensitive coordination data and conveying time-sensitive management data in dynamic platooning or on inter-platoon communication;

the method comprising:

configuring a first logical resource pool dedicated for V2X sidelink communication, or open loop communication, in sharing driving related application data including but not being limited to status data, sensor data, and intention data;

configuring a second logical resource pool dedicated for V2X sidelink communication, or closed-loop communication, in sharing time-sensitive coordination data and/or exchanging time-sensitive coordination data in short distance grouping such as synchronised coordination driving and long distance grouping such as platooning; and configuring one primary set of resources and one or more secondary sets of resources from the second logical resource pool for secured intra-platoon communications.

According to another aspect of the present invention, there is provided a method of channel reservation for reverse transmission performed by a first V2X terminal and one or more second V2X terminals in proximity realising closed-loop communication in exchanging data, such as driving coordination data for time-sensitive decision-making at the first V2X terminal, the method comprising: at the first V2X terminal, determining a number of sub-channels and a number of consecutive forward transmissions for successful conveying a message to one or more intended second V2X terminals;

at the first V2X terminal, further determining a number of consecutive reverse transmissions for an intended second V2X terminal to successful convey the response message intended to the first V2X terminal;

at the first V2X terminal, performing sub-channels selection and reservation of selected sub-channels for the number of consecutive transmissions identified above;

at the first V2X terminal, on a current transmission, indicating whether the next transmission on the selected sub-channel(s) is reserved for its forward transmission or for reverse transmissions from the intended V2X terminal;

at the second V2X terminal, upon the detection of the indication channel reservation from the first V2X terminal in the last reception, performing transmission according to granted channel reservation information; and at the second V2X terminal, on the current transmission using sub-channel(s) granted by the first V2X terminal, indicating the number of remaining transmissions that use channel reservation by the first V2X terminal.

According to another aspect of the present invention, there is provided a method for use in an advanced wireless communication system such as 5G (the Fifth Generation) system, to configure dynamic-platooning capable V2X terminals for highly secured intra-platoon communication where the resources will be utilised and reused, the method comprising:

configuring or preconfiguring 'Platooning TX range' Information element (IE), indicating whether the transmission range control feature is enabled or disabled for intra-platoon communication;

configuring or preconfiguring the 'Platooning resource reuse factor K' IE, indicating maximum 'K' number of non-overlapping resources, per primary resource set or secondary resource set, being allowed for one transmission occurrence at every platoon member in a platoon or virtually concatenated platoons or longitudinal aligned platoons regardless number of platoons' members;

configuring or preconfiguring the 'DMRS offset' IE, for use in identifying the second DMRS orthogonal sequence for use in alternated with the given first DMRS orthogonal sequence, on every second resource reuse;

configuring or preconfiguring the 'platooning resource set periodicity' IE, indicating the periodic occurrence of the resource set within the second logical resource pool;

at a platoon member, on the selected or assigned resource or sub-channels within the resource set for transmission, transmitting control channel (i.e. PSCCH) which is intended to neighbouring platoon member(s) and detectable by all platoon members;

at the said platoon member, on the said selected or assigned resource or sub-channels within the resource set for transmission, transmitting associated shared channel (i.e. PSSCH) which is only decodable at all platoon member(s);

at a platoon member, on the remaining resources or sub-channels within the resource set which are not selected or assigned for transmission, monitoring control channels (i.e. PSCCHs) for intended SCI; and upon successful detection of an intended SCI, performing the reception and decoding of the associated shared channel (i.e. PSSCHs); and at said platoon member, on the resources or sub-channels within the resource set which are not selected or assigned for transmission, and intended SCI is detected, performing the residual TX power measurement using the alternated DMRS sequence.

Advantageous Effects of Invention

The referred embodiment directly relates to vehicular data communication for use in system such as 5G as the communication platform for the realisation of automated driving applications.

A first aspect generally relates to the integrated logical resources pool and the associated configurations for V2X communication in autonomous mode with and without network assistance. The integrated logical resources pool comprises the first logical resource pool and second logical resource pools, which are configured to share the same bandwidth part (BWP) or to be in adjacent BWPs as an alternative. When being configured to share the same BWP, the slots being selected to form the first resource pool and the slots being selected to form the second resource pool are time-multiplexed and further have different numerologies. The first logical resource pool is configured for open loop communication, which tends having high transmit power for desired coverage hence best suited sharing driving application data such as status data, sensor data, and intention data for awareness driving, sensing driving and limited cooperative driving applications. The second logical resource pool is configured for closed loop communication which tends having short range, requires ultra-reliability and ultra-low latency hence best suited for exchanging time-sensitive coordination data for synchronised cooperative driving in short distance grouping (e.g. lane change, merging, passing, intersection coordination) and long distance grouping (e.g. platooning). Therefore, in the same bandwidth allocated for V2X communication, V2X-Vehicles may transmit and receive various types of driving application messages with different quality of service and traffic characteristic depending on the maturity of the on-board automated driving application hence enabling the progressive development.

A second aspect generally relates to the 'channel reservation for reverse transmission' method as a solution for realising low and guaranteed latency 'ask-response' protocol or so called low and guaranteed latency closed loop communication. The method involves first V2X-terminal and second V2X-Terminal forming a short or long distance grouping. For a particular application where the first V2X-terminal may send a message to the second V2X-terminal and further expect a replied message from the second V2X-terminal within certain period for time-sensitive decision-making, the first V2X-terminal firstly decides number of consecutive transmissions for transmitting an application message and corresponding replied message. Secondly, in the aforementioned second resource pool, the first V2X-terminal performs sub-channels selection and reserve the selected sub-channels for the decided number of consecutive transmissions for conveying both application message and corresponding replied message. On a designated transmission, the first V2X-terminal will explicitly indicate whether the next transmission is reserved for forward or reverse transmissions. If the next transmission(s) is/are granted for reverse transmission at the second V2X-terminal, the first V2X-terminal further indicate number of consecutive transmissions that is/are allocated for the second V2X-terminal to transmit. On a transmission where sub-channels are reserved by the first V2X-terminal, the second V2X-terminal explicitly indicate the remaining number of reverse transmissions. Therefore, with this channel reservation for reverse transmission', the latency in channel selection and reservation at the second V2X-Vehicle for transmitting replied message is eliminated, the first V2X-terminal can control when it expects to receive the replied message from the second V2X-terminal for timely decision-making hence the latency of the application level closed loop communication can be low and guaranteed.

A third aspect generally relates to resource optimisation for highly secured platooning communication. In an embodiment, 'resource reuse factor' parameter and second DMRS sequences are introduced. The 'resource reuse factor' parameter indicates a set of 'K' non-overlapping resources, which are allocated or set a limit to a platoon regardless number of platoon members, for one transmission instance from all platoon members concurrently. Preferably, 'K≥3' and '3' is the default value. Typically, the first 'K' platoon members will in turn be assigned or select one resource in/for the set for their transmission. The remaining platoon members will then reuse the selected resources for their transmission basing on the largest possible longitudinal distance from the platoon members that have selected the same resource for transmission. Any two-platoon members in the same platoon or across platoons, which align longitudinally, sharing the same resource for concurrent transmission, will alternately use the first and second DMRS sequences for their reference signal in concurrent transmission. The first DMRS and second DMRS are orthogonal enabling any platoon members in between any consecutive platoon members, which are sharing the same resource for simultaneous transmission, to concurrently receive data/signal from one and measure interference from the other for further use in transmission range control. According to an embodiment, in a system, there is one primary set of 'K' non-overlapping resources, and one or more secondary set of non-overlapping resources. 'L' can be equal to 'K'. In the absence of any platoon that may coexist laterally, the primary resource set is always selected or configured for use in intra-platoon communication. The platoon leader decides the selection of secondary set for temporary use when lateral coexistence of platoons is potentially occurring. Since the minimum number of resources for intra-platoon communications at one transmission occurrence (regardless number of platoon members) has been determined, sets of selected non-overlapping sub-channels within a resource pool can be reserved periodically for intra-platoon communication. To protect intra-platooning communication from channel collisions and/or co-channel interferences caused by other V2X-Vehicles, which share the same resource pool for non-intra-platooning communication, the indexes of the selected sub-channels in the periodic sets can be masked off for selection.

Furthermore, the privacy and security of intra-platoon communication is further enhanced by using '8-bits Platoon ID' in CRC masking on Control channel (i.e. PSCCH) for intra-platoon communication, so that only platoon members with the same platoon-ID can detect the intra-platoon communication SCI; or generating scrambling sequence for use on PSSCHs scrambling, make the intra-platoon shared channels look like noise to other V2X-vehicles sharing the same second V2X-resource pool.

Where, 'Platoon ID' may be configured by the network for use at the platoon leader and its platoon members, or derived by the platoon leader and further use at its platoon members.

The preferred embodiment in one form, resides broadly in system resource structure and configuration method for use in a vehicular communication system comprising a plurality of V2X-equipped vehicles capable of using the basic open loop V2X communications to share their status data, sensor data and intention data to assist the realisation of awareness/sensing driving applications. Among the said plurality of V2X-equipped vehicles, there are some V2X-vehicles capable of more advanced V2X communication to share and establish close loop communication for exchanging time-sensitive or time-intolerant intention data and/or coordination data reliably assisting the realisation of synchronised cooperative driving applications in short distance grouping and in long distance grouping i.e. dynamic platooning. The basic system resource structure is the integrated logical resource pool comprising first logical resource pool having slots on the first numerology and second logical resource pool(s) having slots on the second numerology, being configured or preconfigured to share the same BWP or on adjacent BWPs as an alternative. When being configured to share the same BWP, the first logical resource pool slots and the second logical resource pool slots may be time-multiplexed in comb-format where multiple second logical resource pool slots are interleaved between any two consecutive slots of the first logical resource pool. The first logical resource pool further comprise indexed first sub-channels dedicated to open-loop V2X sidelink communication for further use in sharing driving related application data including but not being limited to status data, sensor data, and intention data. The second logical resource pool comprises indexed second sub-channels dedicated to closed loop V2X sidelink communication for further use in sharing time-sensitive coordination data and/or exchanging time-sensitive coordination data in short distance grouping (e.g. synchronised coordination driving) and long distance grouping (e.g. platooning).

One embodiment of the present invention relates to the method on 'channel reservation for reverse transmission' intended for use in the aforementioned second logical resource pool to realise low & guaranteed latency physical layer assisted 'ask-response' protocol or so called low & guaranteed latency closed-loop communication. According to the present embodiment, the 'channel reservation for reverse transmission' involves a first V2X-Vehicle and one or multiple second V2X-Vehicles forming short distance grouping with close-loop communication to exchange time-sensitive coordination data for driving decision making. At the first V2X-Vehicle, upon the arrival of driving application message intended to a second V2X-Vehicle, where the response is expected from the second V2X-Vehicle, the first V2X-Vehicle selects sub-channels and further reserve the selected sub-channels for number of consecutive forward transmissions in transmitting its message and number of consecutive reverse transmissions in receiving responded message from the second V2X-Vehicle. On transmission basis, the first V2X-Vehicle may use 2-bits in the scheduling SCI to explicitly indicate whether the incoming transmissions are reserved for its transmission or for the reverse transmissions and number of reverse transmissions at the intended second V2X-Vehicle. Upon using the granted sub-channels for transmitting the response, the second V2X-Vehicle may use the 2-bits in the scheduling SCI to indicate the remaining number of transmissions that it will continue to use for reverse transmission.

Another embodiment of the present invention relates to resources reservation for highly secured intra-platoon communication with transmission (TX) range control. According to the present embodiment, the configuration element "Platooning resource reuse factor K" is introduced indicating the number of non-overlapping resources per set being allocated or allowed for shared transmissions at all platoon members within a platoon on one transmission occurrence regardless number of platoon members. The "Platooning resource reuse factor K" further implies the preferred TX-range in number of consecutive V2X-vehicles longitudinally. A said resource is an indexed sub-channel or set of adjacent indexed sub-channels in frequency being selected from the aforementioned second resource pool. A resource set of 'K' locally selected resources, may be preconfigured, configured by a network, or collectively selected by platoon members. Preferably 'K' has value '≥3', and '3' is the default value that indicates 3 time-multiplexed resources in a set for transmission and reception at all platoon members within a platoon on one transmission occasion, and the desired TX range is (3−1=2) consecutive V2X-vehicles in the platoon. Typically, the first 'K' platoon members will in turn be assigned or select one resource in/for the set for their transmission. The remaining platoon members will then reuse the selected resources for their transmission basing on the largest possible longitudinal distance, in number of consecutive V2X-Vehicles, from the platoon members that have selected the same resources for transmission. The largest possible longitudinal distance should be (≥K).

Furthermore, any two-platoon members in the same platoon or across platoons, which align longitudinally, and share the same resource for concurrent transmission, will alternately use the first and second DMRS sequences for their reference signal in concurrent transmission. The first DMRS and second DMRS are orthogonal enabling any platoon members in between any consecutive platoon members, which are sharing the same resource for simultaneous transmission, to concurrently receive data/signal from one and measure interference from the other for further use in transmission range control.

According to the present embodiment, in a system where resources for intra-platoon communication is preconfigured or configured by a network, there configure one primary set of 'K' non-overlapping resources, and one or more secondary set of 'L' non-overlapping resources. 'L' can be equal to 'K'. In the absence of any platoon that potentially coexist laterally, the primary resource set is always selected or configured for use in intra-platoon communication. The platoon leader decides the selection of secondary set for temporary use upon the potential occurrence of lateral coexistence of platoons. As the number of resources for intra-platoon communications at one transmission occurrence, regardless number of platoon members, is determinable, sets of selected non-overlapping sub-channels within a second resource pool can be reserved periodically for intra-platoon communication. The indexes of the selected sub-channels in the periodic sets for intra-communication can be further masked off for selection hence protecting intra-platooning communication from channel collisions and/or co-channel interferences caused by non-intra-platoon communication.

According to the present embodiment, in preventing intra-platoon communication signal from illegal perception/interception, the CRC of sidelink control channel carrying scheduling SCI is masked or scrambled with the 8-bits platoon-ID so that only platoon members with the same platoon-ID can detect the intra-platoon communication SCI. Additionally, the associated sidelink shared channel's block of bits prior to channel modulation is scrambled with platoon-ID specific scrambling sequence, making the sidelink shared channel on the intra-platoon communication resources look like noise to other V2X-vehicles or devices that share the same second V2X-resource pool for transmission/reception. A platoon-ID may be configured by the network for use in at the platoon leader and platoon members or determined at the platoon leader and for use at the platoon members.

Any of the features described herein can be combined in any combination with any one or more of the other features described herein within the scope of the invention.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
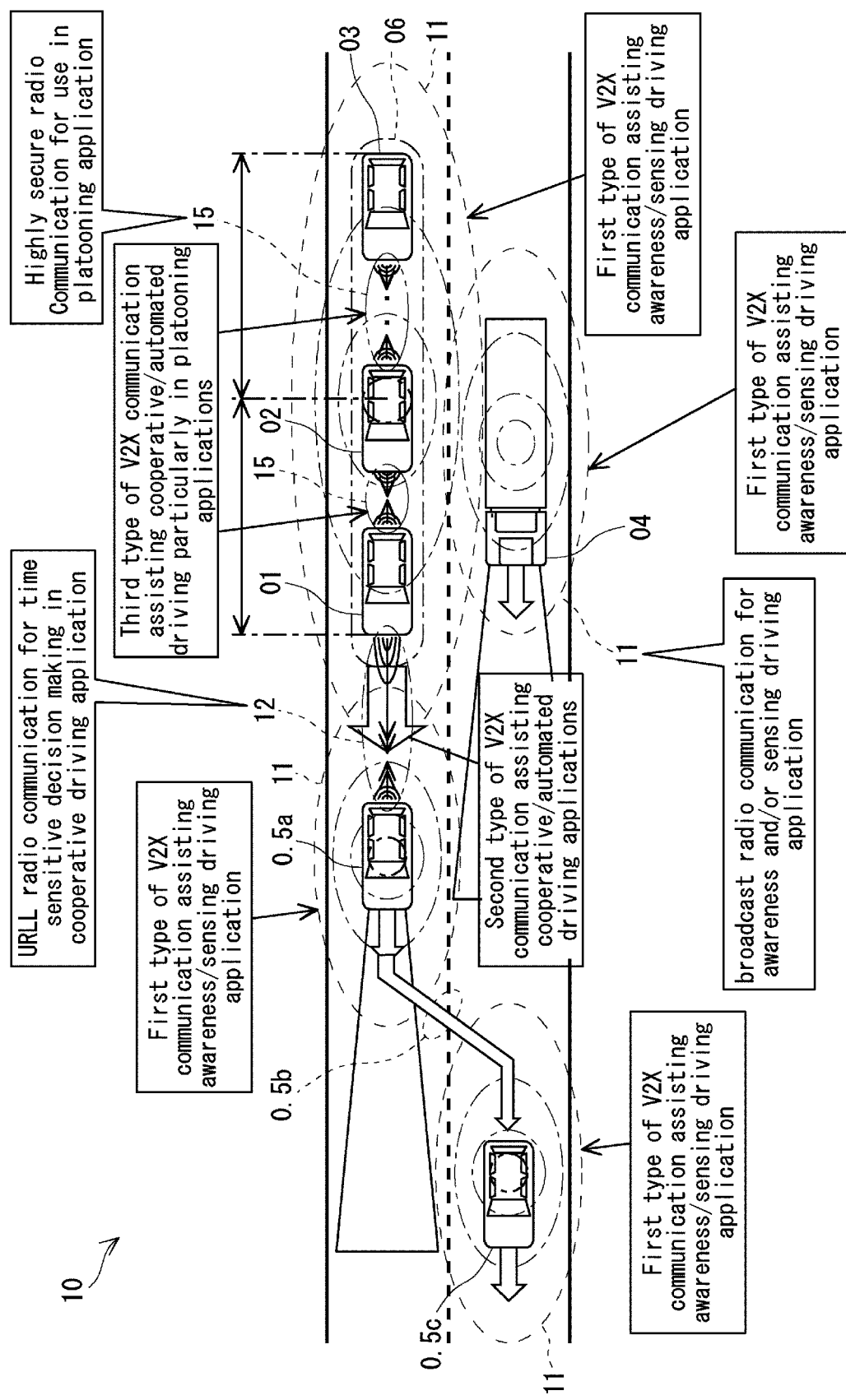
FIG. 1 is identified vehicular communication assisting the realisation of partially or fully automated driving applications according to SAE (Society of Automotive Engineers) International.

FIG. 1 exemplarily illustrates a typical vehicular communication system (10) comprising plurality of V2X-equipped vehicles (e.g. 01, 02, 03, 04 and 05) which are all capable of using the first type of V2X communication (11) to share their status data, sensor data and intention data to assist the realisation of awareness/sensing driving applications (i.e. SAE application level 0, 1, or 2). For example, a V2X-vehicle (02), among a group of V2X-vehicles (01, 02, . . . , 03) which has formed the platoon (06), may use the first type of V2X communication (11) and in a first designated logical resource pool broadcasting the platoon's status data, informing the surrounding vehicles such as (04) and (05) it's the platoon presence an integrated moving unit. A V2X-vehicle within the platoon (06) such as the platoon leader vehicle (01) may monitor the same first designated resource pool for the presence and status data of the surrounding vehicles, which does not belong to its platoon, such as the truck (04) on the side lane and car (05) in the front.

In the system 10 of FIG. 1, some vehicles such as {01, 02, 03, and 04} may be equipped with advanced V2X OBUs (on board units) capable of the second type of V2X communication (12) for exchanging time-sensitive or time-intolerant intention data and/or coordination data reliably assisting the realisation of partially or fully automated driving applications (i.e. SAE application level 3, 4, or 5). For example, upon sensing the slower moving V2X-vehicle (05) in the front, the platoon leader V2X-vehicle (01) may use a second type V2X communication (12) and in a second designated logical resource pool transmit intention/coordination application messages to the vehicle (05), providing the truck (04)'s status data which may be beyond the TX/RX range of vehicle (04) & (05), and further requesting a safe overtaking. Upon the reception of safe overtaking request, the V2X-Vehicle (05) within a predefined time frame, must acknowledge to the safe overtaking request and further indicate its intention such as it is merging left (e.g. 05.b) to provide the safe passage for the platoon (e.g. 06) led by V2X-Vehicle (01) moving forward. The acknowledgement to the request and associated left-merging intention (05.b) are time-critical for the time-sensitive decision-making at the platoon leader (01) and therefore there is a need for an "ask-response" protocol with shortest round trip latency. Furthermore, in realising dynamic platooning (e.g. 06), some advanced V2X OBU equipped vehicles (e.g. 01, 02, . . . , 03) requires the third type of V2X communication (15) for highly secured communication which allows them to exchange time-sensitive intention data, coordination data, and/or platooning management data using a protected set of reserved resources within the second designated logical resource pool.

Figure 2:
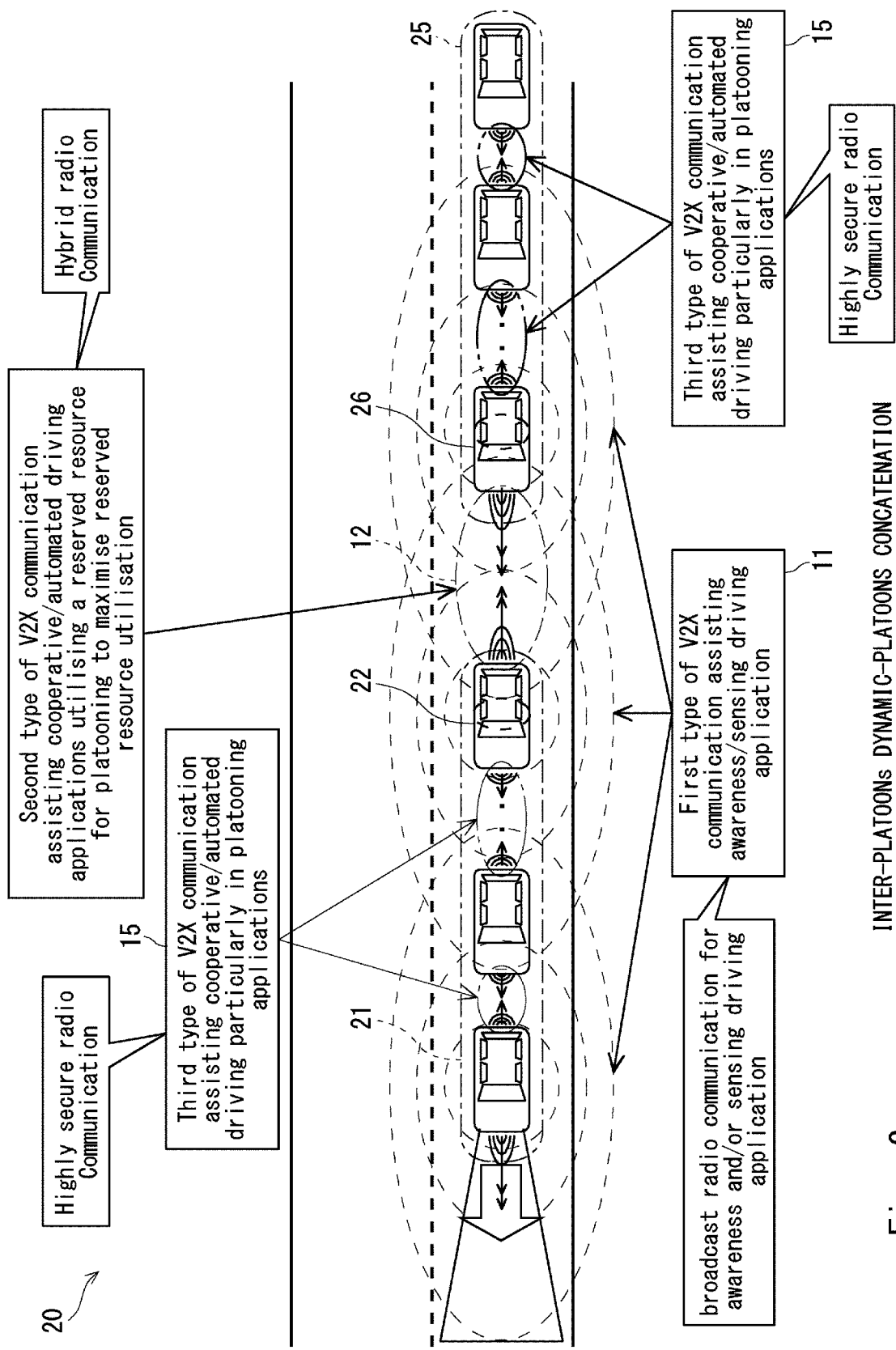
FIG. 2 is intra-platoon communication assisting the platooning management/control and inter-platoon communication assisting the platoons concatenation.

According to many studies, by use of platooning, the distances between V2X vehicles can be greatly reduced, overall fuel consumption is lowered, and number of needed drivers can be reduced Ref[1]. However, if the platoon is too long, it will sometimes interrupt the operation of other vehicles and traffic management authority. So, 3GPP has considered limiting the maximum number of V2X-vehicles per platoon to five Ref[1]. However, limiting the maximum number of V2X-vehicles per platoon when long platoon is permissible, will limit the platooning's benefit. The inter-platoons dynamic that may dynamically and virtually remove the restriction of platooning size wherever permissible shall make the platooning concept more robust adapting to the driving environment/condition. According to the present embodiment, the inter-platoons dynamic—platoons concatenation concept is proposed utilising the "hybrid radio communication" (12) as being exemplarily illustrated in FIG. 2. In reference to the FIG. 2, that exemplarily illustrates the inter-platoons dynamic—platoons concatenation (20), when approaching the platoon (21) from behind, the platoon 25's leader (i.e. 26) shall utilise the second type V2X communication (12) to communicate with the vehicle (22) which is last V2X-vehicle in the platoon (21), facilitating the platoon concatenation. Once, the platoon concatenation is confirmed, the communication between V2X-vehicle (22) and V2X-vehicle (26) shall transit from the second type V2X communication to highly secured third type V2X communication, that enable the V2X-vehicle (26) instantaneously follows the V2X-vehicle (22) at the desired closed space, and leads other V2X vehicles in its platoon to follow. Furthermore, platoon concatenation enables multiple platoons, which coexist longitudinally, sharing the same primary set of reserved resources without the risk in resource selection collision and interference. Thus optimising system resource usage for platooning is achieved.

Figure 3A:
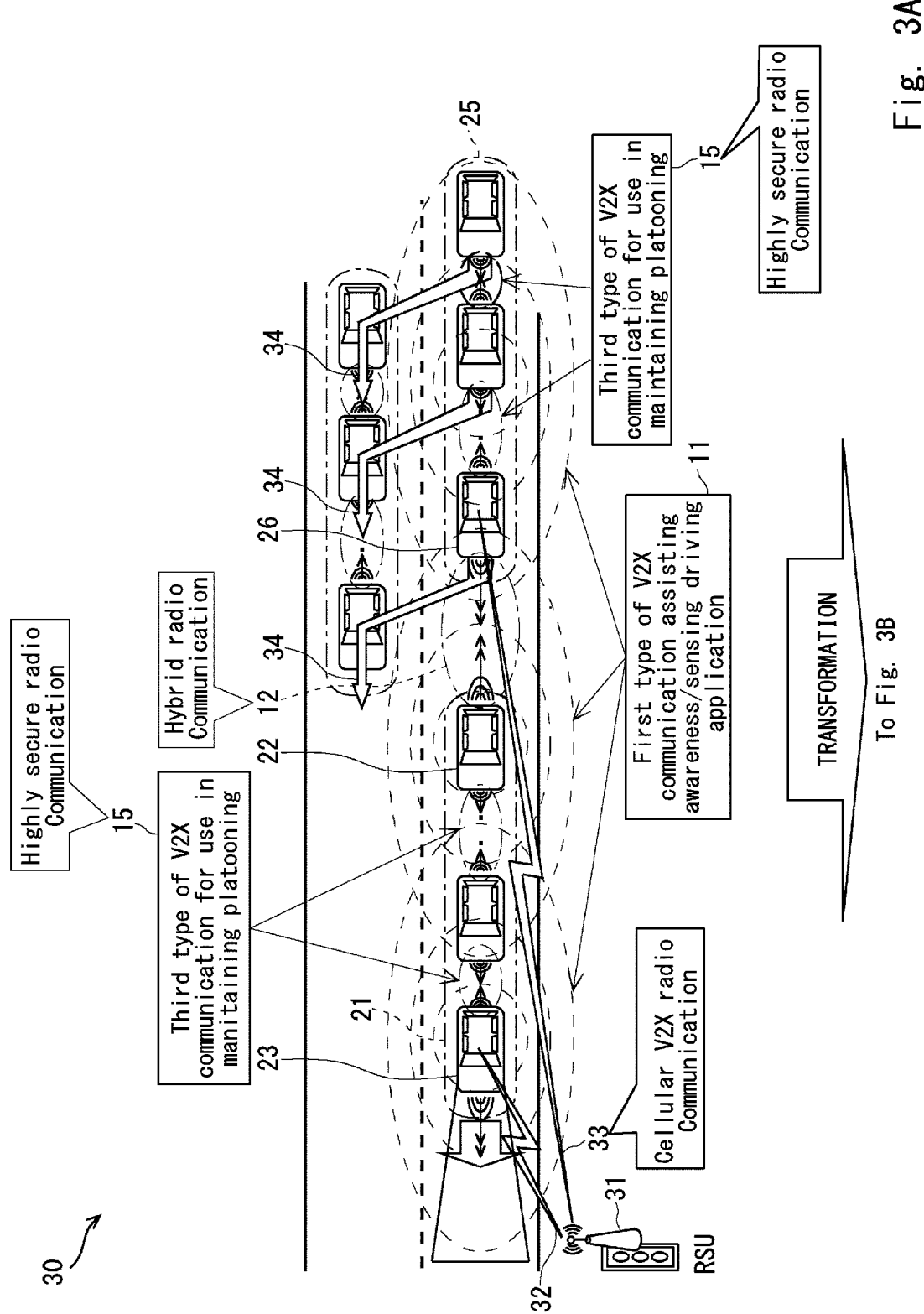
FIG. 3 is Exemplary illustration of vehicular communication assisting the inter-platoons dynamic.
Figure 3B:
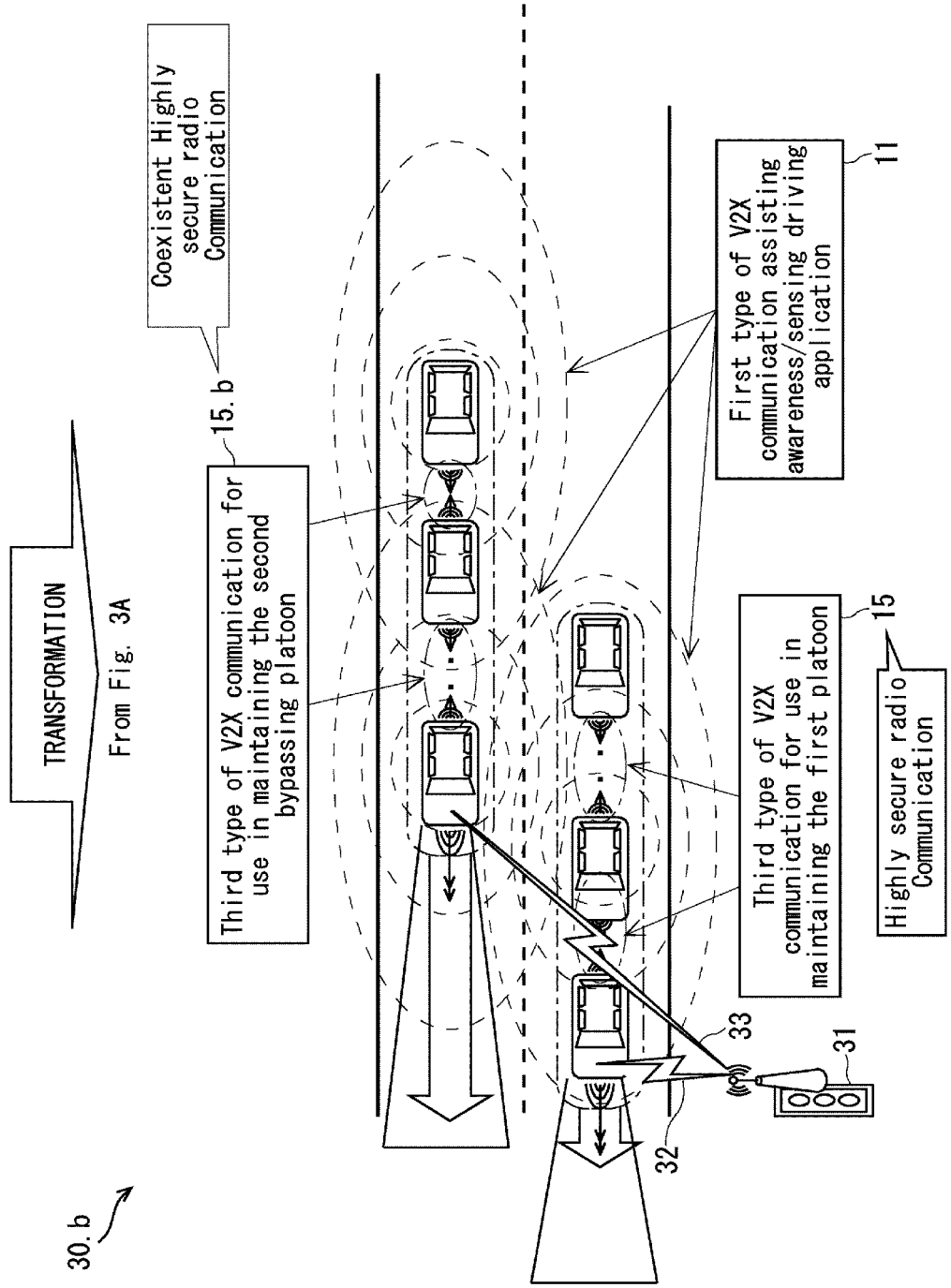

Furthermore, the platoon concatenation topology with the "hybrid V2X communication" can be designed to be adaptive according to the driving condition and environment. For example, in a green light optimisation scenario as illustrated in FIG. 3, the system (30) comprises the platoon (25) led by V2X-Vehicle (26) and the platoon (21) led by V2X-Vehicle (23) which are concatenated using the hybrid radio communication (12) as the virtual link. The platoon 21's leader (23) and the platoon 25's leader (26) may be capable of communication at a time with a proximity road side unit (RSU) such as traffic light controller (31) via cellular V2X-communication links (32) and (33) respectively. When approaching the RSU (31) traffic light controller, the platoon 25's leader (26) may be advised to speed up to certain speed limit to safely bring its platoon through the current green light cycle. The V2X-vehicle (26) may then decide to terminate the platoon concatenation, and co-ordinately decide to merge right (34) or alternatively being instructed by the RSU (31) to merge right (34) changing to new topology as show in system 30.b. Per system 30.b, immediately prior to merging right and speeding up, the platoon 25's leader (26) instructs its platoon members to use a secondary set of reserved resources for its intra-platoon communication (15.b), enabling its platoon (25) bypass the platoon 21 without the risk of causing interference of channel collision.

Having further discussed the needs of mutual coexistence of the first type V2X communication (i.e. open loop communication), the second type V2X communication (i.e. closed-loop communication) with low latency 'ask-response' protocol, and the highly secured third type V2X communication with optimum system resource usage, within a V2X-Vehicle for the realisation of automated driving applications especially dynamic platooning application, where the Rel'14/15 sidelink communication may be considered suitable only for the first type V2X communication, the following subsequent paragraphs shall discuss further and disclose:

1. The integrated resource pool structure which enables the signal transmission and reception in the first, second and third types V2X communications as the first embodiment;
2. The "channel reservation for reverse transmission" method for the realisation of second type V2X communication (i.e. closed-loop communication) with low latency messages exchanges as the second embodiment; and
3. TX range control method for use in intra-platoon communication which is in turn to enable the introduction of resource reuse, where a set of sub-channels can be predetermined or determined and further protected for realisation of highly secured third type V2X communication as the third embodiment The first embodiment of the present invention relates to the integrated logical resource pool structure (100) of FIG. 4, for all V2X communications including the aforementioned first type, second type, and third type V2X communications assisting the realisation of automated driving applications defined by SAE. According to the present embodiment, the integrated V2X resource pool for use at V2X-UEs in realising SAE applications (e.g. 101) comprises at least two separately configured and/or preconfigured logical resource pools (102) and (103) being frequency-multiplexed or time-multiplexed. The first V2X resource pool (102) is preconfigured or configured for the first type of V2X communication (or open loop communication) (11) that enable V2X-vehicles to share their status data, sensor data and intention data assisting the realisation of awareness/sensing driving application (i.e. SAE application level 0, 1, or 2). The second V2X resource pool (103) may be preconfigured or configured for the aforementioned second and third types of V2X communications (i.e. closed-loop communication) (12 and 15), enabling vehicles equipped with more advanced V2X OBDs reliably exchanging time-sensitive intention data and/or coordination data assisting the realisation of partially or fully automated driving applications (i.e. SAE application level 3, 4, or 5).

Figure 5:
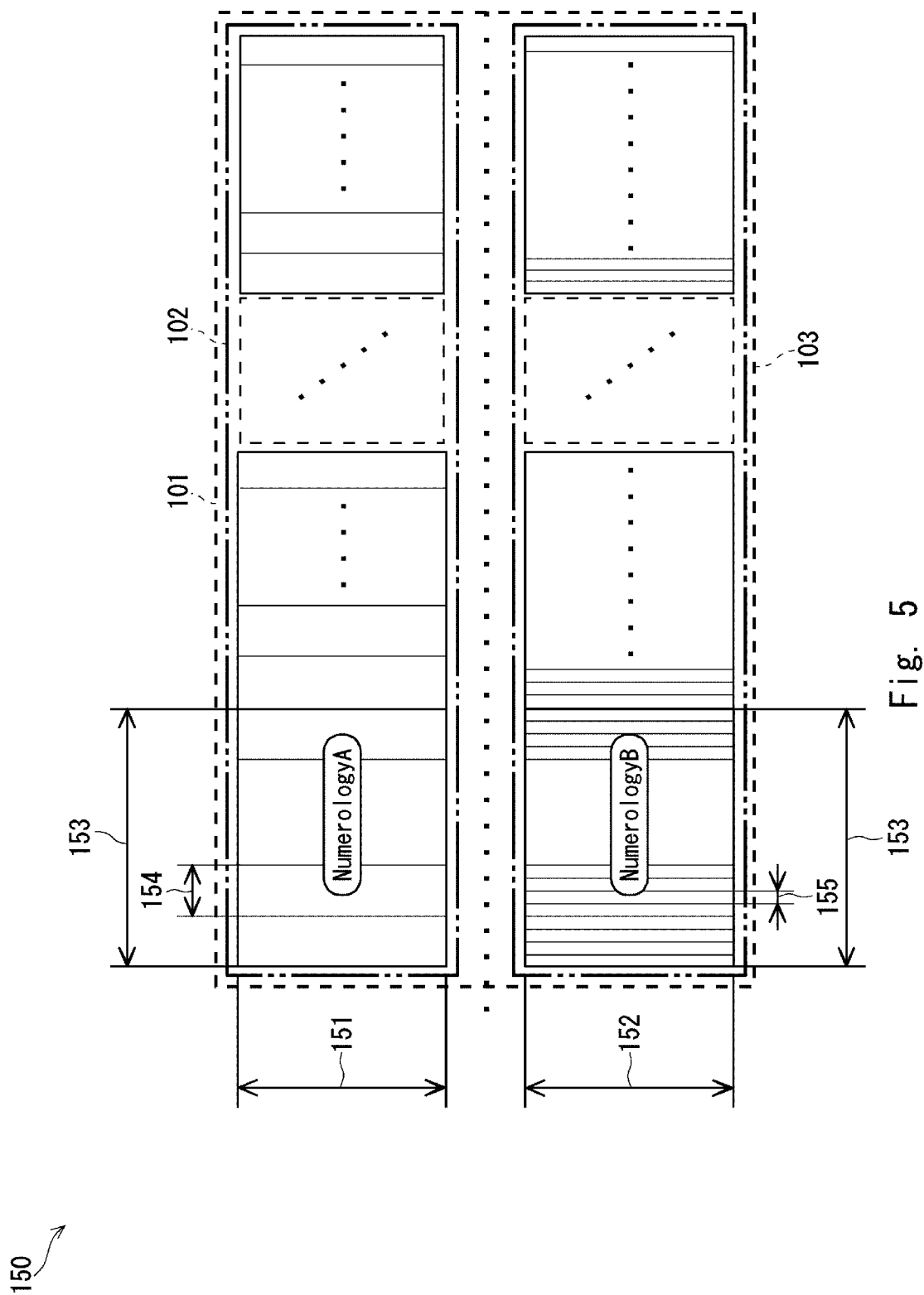
FIG. 5 is exemplary illustration of integrated resource pool structure for V2X communication supporting the realisation of automated driving using separated Bandwidth Parts (BWPs).

In reference to the exemplary structure (150) of FIG. 5, the integrated V2X resource pool for the realisation of SAE applications (e.g. 101) can be configured, for use at V2X-UEs, having the first V2X resource pool (102) and second V2X resource pool(s) (103) in different BWPs (e.g. 102 in 151 and 103 in 152). The BWP (e.g. 151) containing the first V2X resource pool (102), and the BWP (e.g. 152) containing the second V2X resource pool (103) can be adjacent BWPs and can be configured with different numerologies. For example, the slot and symbol duration of the second V2X resource pool (155) can be shorter than those of the first V2X resource pool (151).

Figure 6:
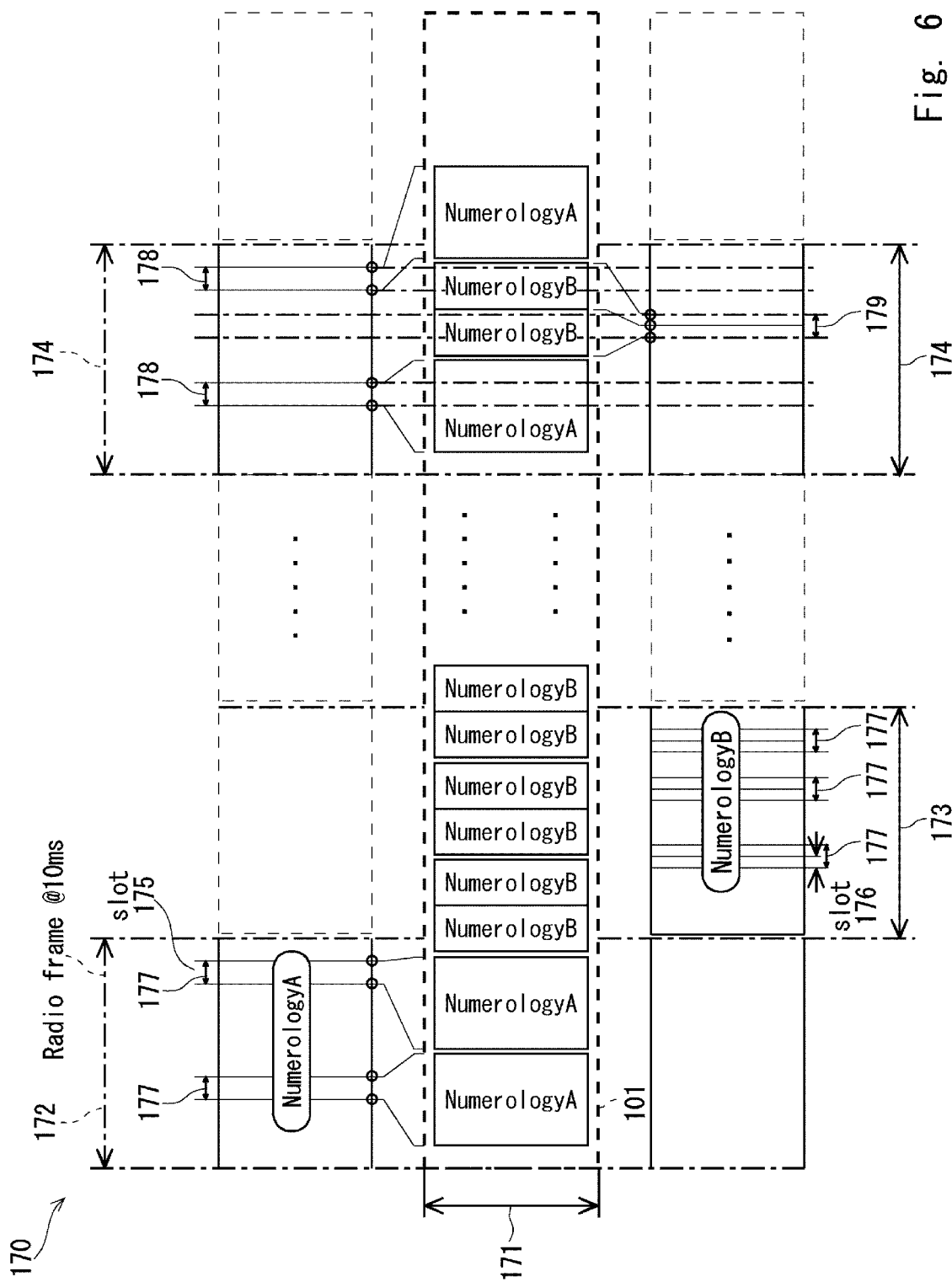
FIG. 6 is exemplary illustration of integrated resource pool structure for V2X communication supporting the realisation of automated driving using shared Bandwidth Part (BWP).

Alternatively, with the exemplary structure (170) of FIG. 6, the integrated V2X resource pool for the realisation of SAE applications (e.g. 101) can be configured to have the first V2X resource pool (102) and the second V2X resource pool(s) (103) physically sharing the same BWP (e.g. 171). The slots forming the first V2X resource pool (102) and the slots forming the second V2X resource pool (103) may be configured to have different numerologies (e.g. 175 and 176) and to come from different radio frames (e.g. 172 and 173) or from the same radio frame (e.g. 178s in 174 and 179 in 174).

Figure 4:
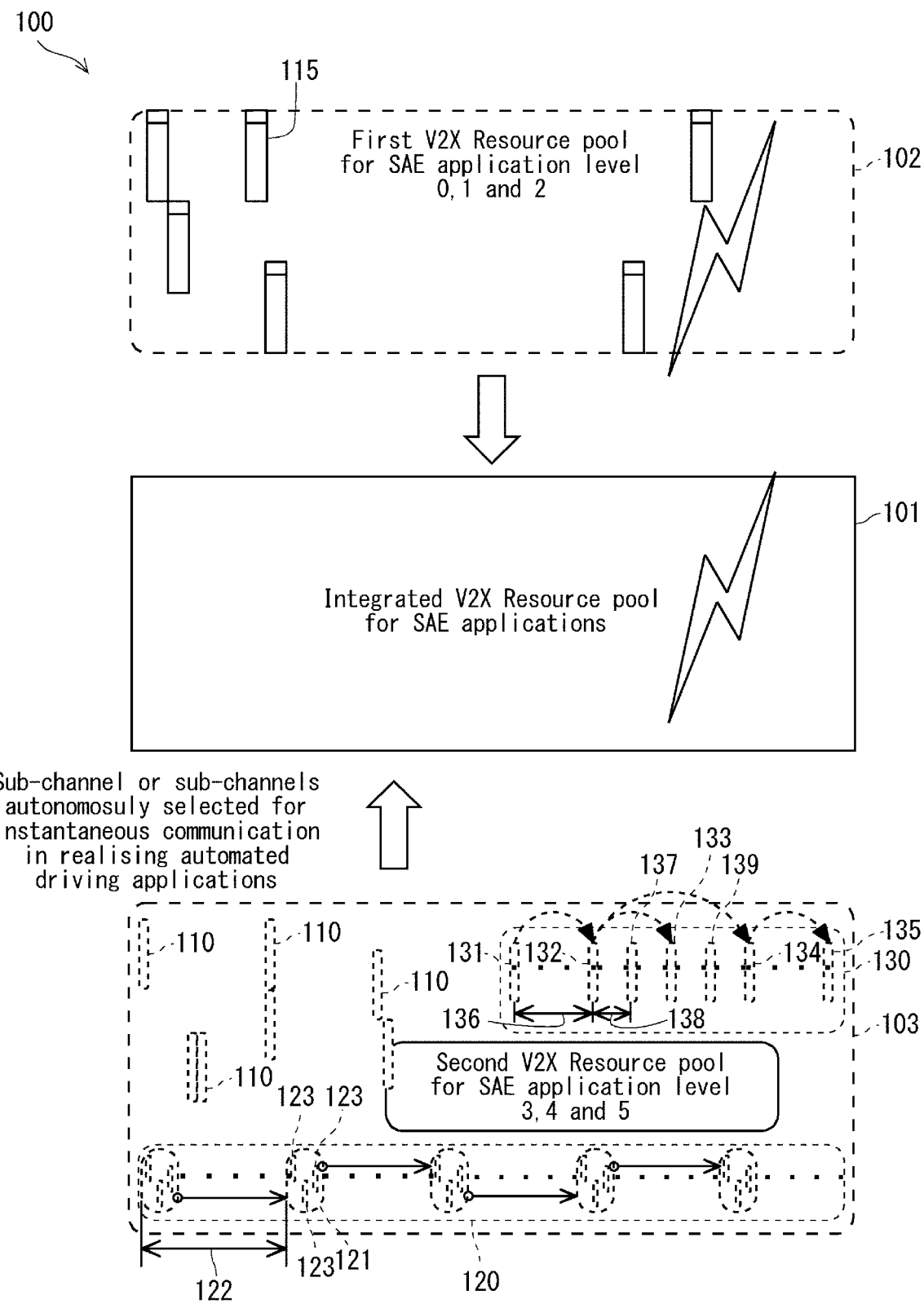
FIG. 4 is integrated resource pool structure for V2X communication supporting the realisation of automated driving according to the defined SAE's application levels.

In reference back to the resource pool structure (100) of FIG. 4, the second V2X resource pool (103) further comprises plurality of time-frequency multiplexed sub-channels (e.g. 110s). Sub-channel size is configurable or pre-configurable for further selection. In realising highly secured intra-platoon communication, a set (e.g. 121) of plural sub-channels (e.g. 123s) is selected and reserved with configurable periodicity (e.g. 122) and further protected for the third type of V2X communication (e.g. 120), thus leaving the remaining sub-channels in the resource pool (103) for the second type V2X communication (e.g. 130).

On the remaining sub-channels in a second V2X resource pool for the second type V2X communication, a V2X-vehicle may utilise the 3GPP Rel'14/15 LTE sensing-based SPS scheme, to select and further reserve the selected sub-channels (e.g. 130) for a number of consecutive transmissions (e.g. 131, 132, 133, 134, 135 . . . ) with periodicity (e.g. 136), where a transmission can be a single transmission (e.g. 131, or 134 or 135) or multiple retransmissions (e.g. 132 and 137 or 133 and 139). In realising automated driving applications, which requires closed-loop communication for exchanging driving application messages, the said consecutive transmissions must be capable to convey time-intolerant application data from a first V2X-vehicle to one ore more intended second V2X-vehicles in proximity. The second V2X-Vehicle may be then requested to respond upon the successful reception of the first vehicle's application data by a defined deadline for time-sensitive decision making at the first V2X-vehicle. Otherwise, the request from the first V2X-Vehicle is considered "no longer applicable". Since the first and second V2X-vehicles independently selects sub-channels and further reserves the selected sub-channels for their transmissions per 3GPP Rel'14 LTE sensing-based SPS scheme, there is no guarantee that the first V2X-vehicle will receive the expected response from second V2X-vehicle on time for time-sensitive decision making.

In realising closed-loop communication, the second embodiment of the present invention is related to the "channel reservation for reverse transmission" concept, which is proposed as compliment enhancement on the current 3GPP Rel'14/15 LTE sensing-based SPS scheme, to ensure that a request's sender will receive the expected response from request's receiver at an expected time for time-sensitive decision making. Conceptually, the first V2X-vehicle instantaneously allocates its incoming reserved sub-channels (e.g. 133 & 139—FIG. 4) for 'reverse transmission' and via physical layer signalling (i.e. SCI) on the current transmission (e.g. 132 & 137—FIG. 4) indicating that reservation for use at the second V2X-vehicle in transmitting the response requested by the first V2X-vehicle. Technically, 1-bit value (e.g. '0' or '1') representing 'transmission direction indication' using the reserved information bits in the "SCI format 1" is sufficient for indicating whether the next selected sub channel is reserved for the 'forward transmission' or 'reverse transmission'. However, 2-bit value (e.g. '00', '01', '10', or '11') is recommended for indicating whether the next selected sub channel is reserved for the 'forward transmission' (i.e. '00') or 'reverse transmission' and number of consecutive transmissions for the 'reverse transmission' (i.e. 1, 2 or 3).

Figure 7:
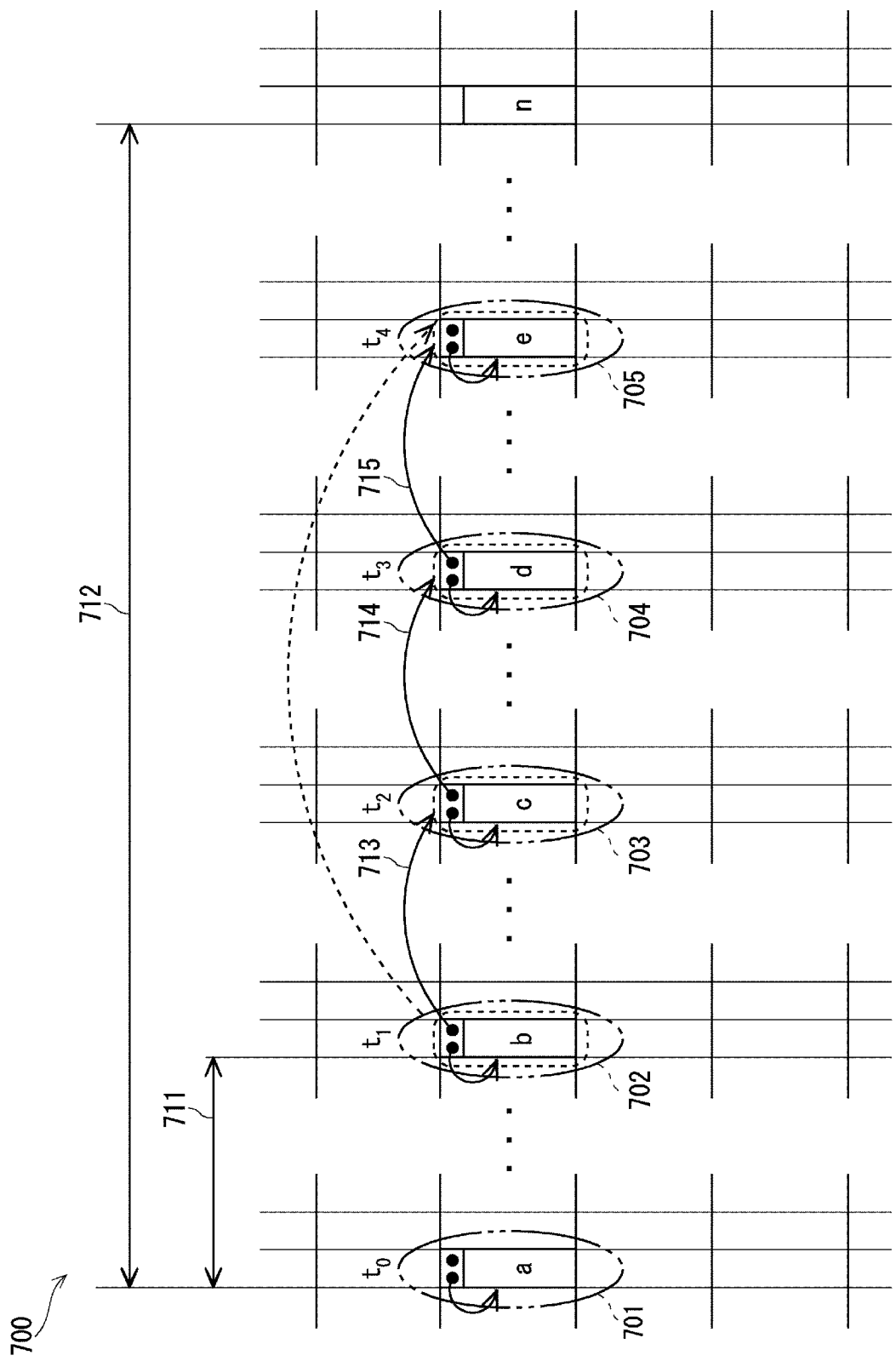
FIG. 7 is exemplary illustration of resource reservation for reverse transmission—single retransmission case.
Figure 8:
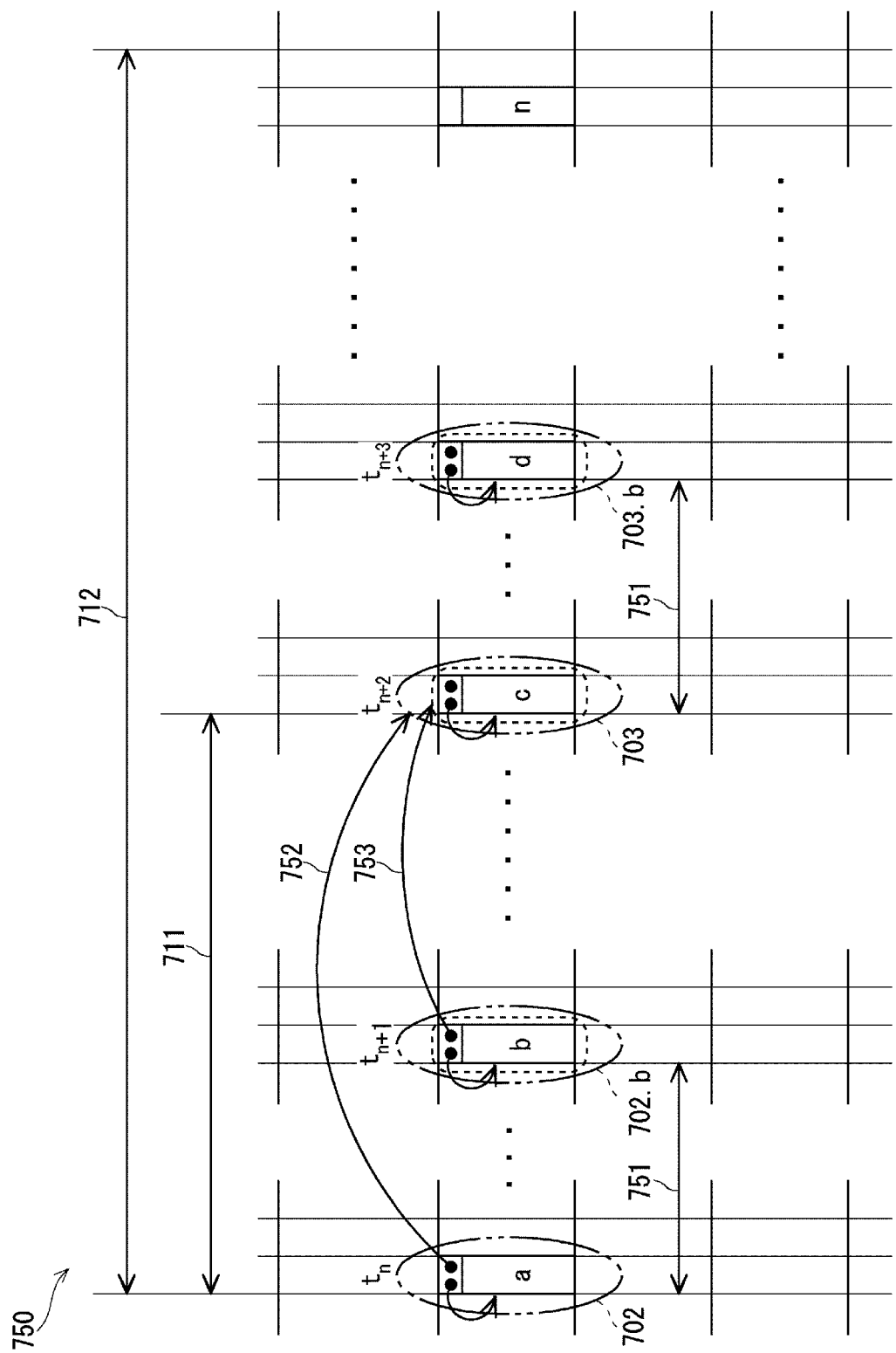
FIG. 8 is exemplary illustration of resource reservation for reverse transmission—multiple retransmissions case.

The concept of "channel reservation for reverse transmission" is further explained using the exemplary FIG. 7 and FIG. 8 for single retransmission case and multiple retransmissions case respectively.

In FIG. 7, the first V2X-vehicle may have selected sub-channels {a@t0 (701), b@t1 (702), c@t2 (703), d@t3 (704) and e@t4 (705)} for consecutive transmissions in the incoming period (712) to convey time-intolerant application data to the second vehicle in proximity:

1. At the time t0 (701), the first V2X-vehicle sets the 'transmission direction indication' in the sub-channel 'a' to '00' indicating the next transmission at 't1' is reserved for 'forward transmission';

2. At the time t1 (702), the first V2X-vehicle sets the 'transmission direction indication' in the sub-channel 'b' to '10' indicating the next 2 transmissions at 't2' and 't3' are reserved for 'reverse transmission' (713), and further implying the following transmission at 't4' reserved for 'forward transmission';

3. At the time t2 (703), upon the successful detection and decoding sub-channels 'b' at '0', the second V2X-vehicle sets the 'transmission direction indication' in the sub-channel 'c' to '01' indicating the next transmission at 't3' are reserved for 'forward transmission' (714); and 4. At the time t3 (703), the second V2X-vehicle sets the 'transmission direction indication' in the sub-channel 'd' to '00' indicating the next transmission at 't4' are reserved for 'reverse transmission' (715), i.e. hand over the transmissions back to the first V2X-vehicle.

In FIG. 8, the first V2X-vehicle may have selected sub-channels {a@tn (701), b@t(n+1) (702.b), c@t(n+2) (703), d@t(n+3) (704) and etc.} for consecutive transmissions and associated retransmissions in the incoming period (712) to convey time-intolerant application data to the second vehicle in proximity:

1. At the time t(n) (702), the first V2X-vehicle sets the 'transmission direction indication' in the sub-channels 'a' to '01' indicating the next transmission at 't(n+2)' and the associated retransmission at t(n+3) is reserved for 'reverse transmission' (e.g. 752);

2. At the time t(n+1) (702.), the first V2X-vehicle sets the 'transmission direction indication' in the retransmitted sub-channels 'b' to '01' indicating the next transmission at 't(n+2)' and the associated retransmission at t(n+3) is reserved for 'reverse transmission' (e.g. 753);

3. At the time t(n+2) (703), upon the successful detection and decoding sub-channels 'a' at 't(n)', and/or sub-channels 'b' at 't(n+1)', the second V2X-vehicle sets the 'transmission direction indication' in the sub-channel 'c' to '00' indicating the next transmissions are reserved for 'reverse transmission' i.e. hand over the transmissions back to the first V2X-vehicle; and 4. At the time t(n+3) (703), the second V2X-vehicle also sets the 'transmission direction indication' in the sub-channel 'd' for retransmission to '01' further indicating the next transmissions are reserved for 'reverse transmission' i.e. hand over the transmissions back to the first V2X-vehicle.

As briefly mentioned before, in realising highly secured intra-platoon communication, a set of plural selected sub-channels is reserved with configurable periodicity and protected for the third type of V2X communication. A set of sub-channels being reserved for secured intra-platoon communication can be decided or selected by a network and then via the platoon leader configured for use at each V2X-Vehicles in a platoon, or can be decided by a platoon leader and then configured for use at each platoon members, or can be collectively decided by each platoon members and then managed by the platoon leader. Despite methods used in selecting and reserving the selected sub-channels set for secured intra-platoon communication, there proposes a mechanism in keeping number of sub-channels being reserved for secured intra-platoon communication to minimal regardless number of platoon members within an established platoon, and principle for self-determining at a platoon leader alternative set of selected sub-channels for short term usage. Furthermore, the set of selected sub-channels being reserved for secured intra-platoon communication can be protected with specific scrambling where the scrambling sequences can only be derived by a platoon members.

Figure 9:
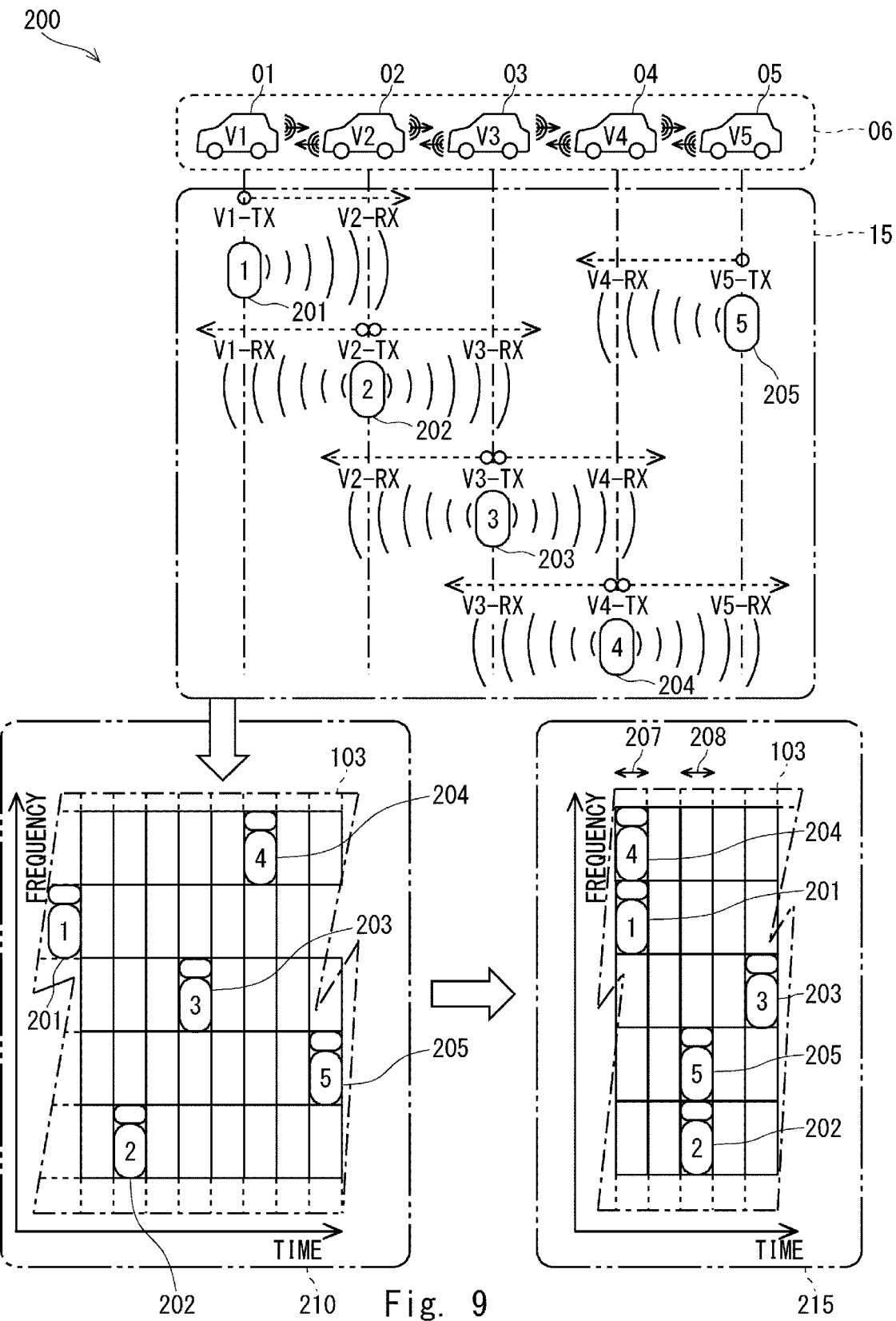
FIG. 9 is exemplary illustration of non-optimised resource reservation according to the prior art for intra-platoon communication.

If the 3GPP Rel'14/15 LTE sensing-based SPS scheme is used as baseline, each platoon member will individually and independently monitor the second resource pool, select sub-channels within the second resource pool, and then reserve the selected sub-channels for a number of consecutive transmissions. Therefore, in a platoon (e.g. 06) having 5 platoon members (e.g. 01, 02, 03, 04 and 05) as being exemplarily illustrated in system (200) of FIG. 9, corresponding to one transmission at every platoon members, a set (e.g. 103) of 5 non-overlapping time-frequency sub-channels (e.g. 201, 202, 203, 204, and 205) are reserved for a transmission. In order to achieve the best platoon dynamic (e.g. 15) [Ref 5 & 6], a platoon member (e.g. V2-202) only communicates with its neighbouring members (e.g. V1-201 and/or V3-203 on sub-channel 2) in exchanging intention data, coordination data, and/or the platoon leader directly or indirectly (i.e. relayed by platoon members) for platooning management data. Thus, the set of reserved sub-channels can be obviously optimised as (215) where sub-channels selected by every third members (e.g. V1 and V4, or V2 and V5) can be frequency multiplexed within single slot (e.g. 201 & 204 in slot 207 and 202 &205 in slot 208) hence reducing the time-span of a reserved resources set. The downside of the 3GPP Rel'14/15 LTE approach when applying for use in intra-platoon communication is that the resources being reserved for intra-platoon communication is uncontrollable, and increase linearly with the increase number of platoons and number of platoon members per platoon. Therefore, there is a need for a system and combined methods where the number of resources being selected and reserved for intra-platooning can be determined and managed.

The third embodiment of the present invention is related to TX range control method for use in intra-platoon communication which is in turn enable the introduction of configurable resource reuse, where a set of sub-channels can be predetermined or determined and further protected for intra-platoon communication regardless of platoon size (i.e. number of platoon members) and number of coexisting active platoons. The method is discussed in the subsequent paragraphs.

As aforementioned, in a vehicular platooning, a platoon member only needs to communicate with one or two neighbouring members i.e. the one immediately in the front and/or the one immediately in the rear. Thus, it is desirable to have a mechanism enabling a platoon member to adjust its TX range on transmission basis so that its transmitted signal sufficiently reaches the intended neighbouring members for successful demodulation and decoding (e.g. 301—FIG. 10), and the undesirable residual TX power may appear as noise or interference that is cancellable or removable when it reaches non-intended members in the same platoon (e.g. 302—FIG. 10).

Figure 10:
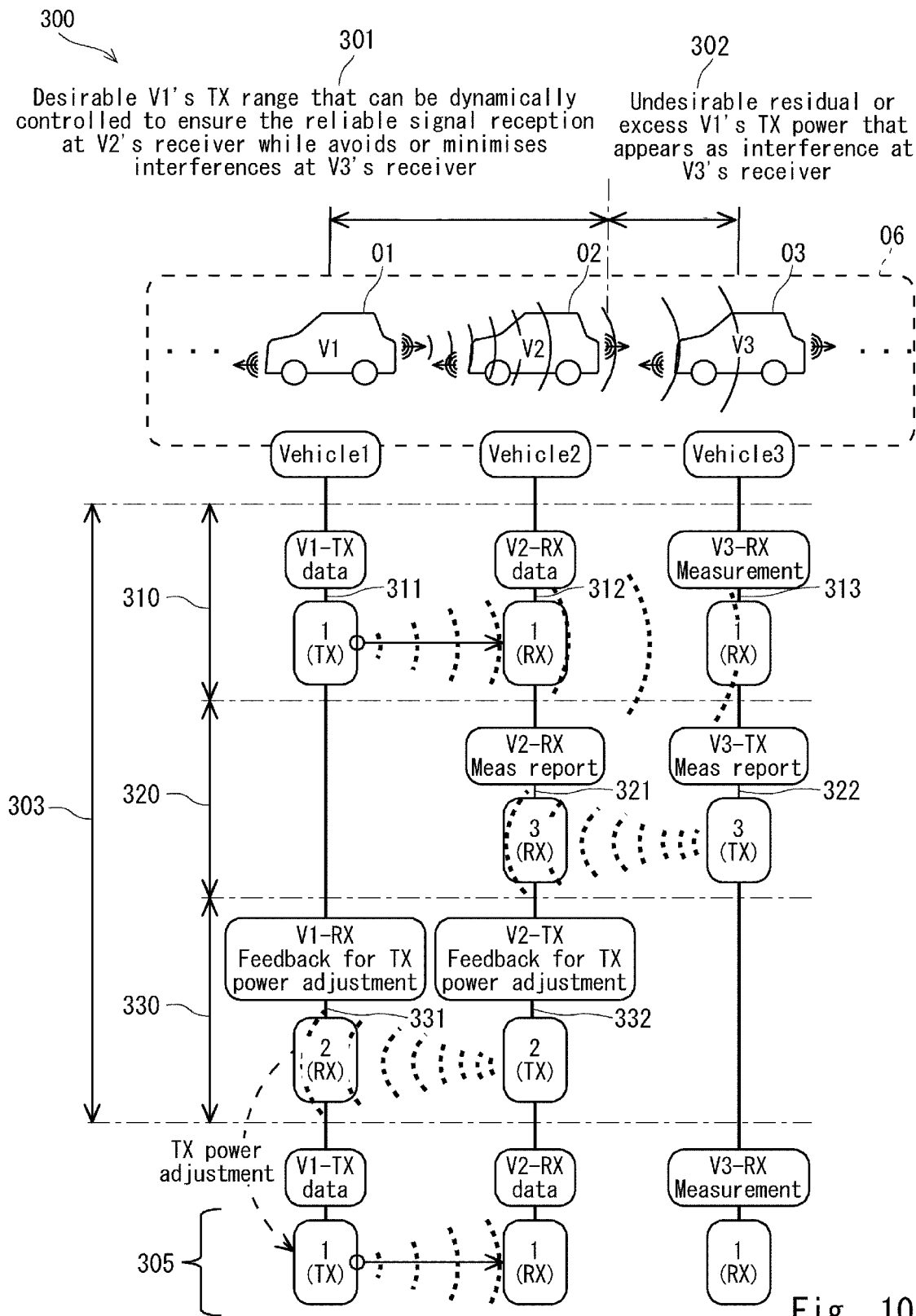
FIG. 10 is conceptual method for dynamically controlling transmission (TX) range in platooning communication.

FIG. 10, schematically outlines the proposed dynamic TX range control protocol (300) for use in intra-platoon communication. According to the present embodiment, the dynamic TX range control protocol (300) is scalable where the basis unit involves at least three consecutive V2X-vehicles namely first V2X-vehicle (e.g. 01), second V2X-Vehicle (e.g. 02) and third V2X-vehicle (e.g. 03) in the same platoon (e.g. 06). As prerequisite, every V2X-vehicles in the platoon is informed and therefore aware of other members' sub-channels being selected and further reserved for a number of consecutive transmissions. For example, V2X-vehicles (01, 02 and 03) are aware of sub-channel #1 (311), sub-channel #2 (332) and sub-channel #3 (322) being reserved by V2X-vehicle (01), (02) and (03) respectively for the incoming transmissions individually. The proposed dynamic TX range control protocol (300) comprises 3 main steps (310, 320 and 330 in 303):

At step 1 (310): on sub-channel (e.g. 1), which is reserved by the first V2X-vehicle for signal transmission (e.g. 311) intended for the reception at the second V2X-vehicle (312), the third V2X-vehicle is required to perform residual TX power measurement i.e. RSRP (313—Reference Signal Received Power) from the first V2X-vehicle;

At step 2 (320): on sub-channel (e.g. 3), which is reserved by the third V2X-vehicle for signal transmission (e.g. 322) intended for the reception at the second V2X-vehicle (321), the third V2X-vehicle is required to provide the report (e.g. 322) for the measurement done in step 1. The measurement done at step 1 may be quantised using index mapping table prior to reporting to reduce the size;

At step 3 (330): on sub-channel (e.g. 2), which is reserved by the second V2X-vehicle for signal transmission (e.g. 332) intended for the reception at the first V2X-vehicle (331), the second V2X-vehicle is required to provide the "TX range indication" for power adjustment to be done at the first V2X-vehicle on the next transmission (e.g. 305). The second V2X-vehicle may use the measurement report from the third V2X-vehicle and decoding result from the last signal reception from the first V2X-Vehicle as inputs for deriving appropriate "TX range indication". The "TX range indication" from the second V2X-vehicle advises whether the first V2X-vehicle should keep the same TX power, or reduce the TX power by number of predefined step-size, or increase the TX power by number of predefined step-size in the next transmission.

In a platooning system with activated 'TX range control' feature, optimum resource reuse for intra-platoon communication can be realised with pre-configuration or configuration which includes 2 new configuration IEs (i.e. Information Element), namely:

Platooning resource reuse factor which has value$\geq 3$, and Orthogonal sequences for use in the alternated set basis

| Sequence Index | Orthogonal sequences first sequences-DMRS | Orthogonal sequences Second sequences-DMRS |
| --- | --- | --- |
| 0 | [+1 +1 +1 +1] | [+1 +1 −1 −1] |
| 1 | [+1 −1 +1 −1] | [+1 −1 −1 +1] |
| 2 | [+1 +1 −1 −1] | [+1 +1 +1 +1] |
| 3 | [+1 −1 −1 +1] | [+1 −1 +1 −1] |

The "Platooning resource reuse factor" indicates the total number of non-overlapping time-frequency resources or sub-channels in a resource set having been selected and then being reserved for sharing by all V2X-vehicles in a platoon at one transmission instance regardless the platoon size (i.e. number of V2X-vehicles in the platoon). In a platoon having number of V2X-vehicles larger than the configured value of the "Platooning resource reuse factor", two or more indexed V2X-vehicles, having the same value of ['assigned index' MOD 'Platooning resource reuse factor'], shall share the same channel resource or sub-channels for concurrent transmission to their neighbouring V2X-vehicles. While selecting the same channel resource for concurrent transmission to their neighbouring V2X-vehicles, the V2X-vehicles, which share the same value of ['assigned index' MOD 'Platooning resource reuse factor'], may use the same orthogonal sequence index, but on alternate first and second sequences as their DMRSs, allowing the in-between neighbouring V2X-vehicles to receiving intended data from the neighbouring V2X-vehicle and simultaneously measuring residual TX power from the other. Furthermore, the first or second sequences can be decided basing on the 'assigned index' as {['assigned index' DIV 'Platooning resource reuse factor'] MOD 2=0 or 1}". The described method can be further explained through exemplary FIG. 11.

Figure 11:
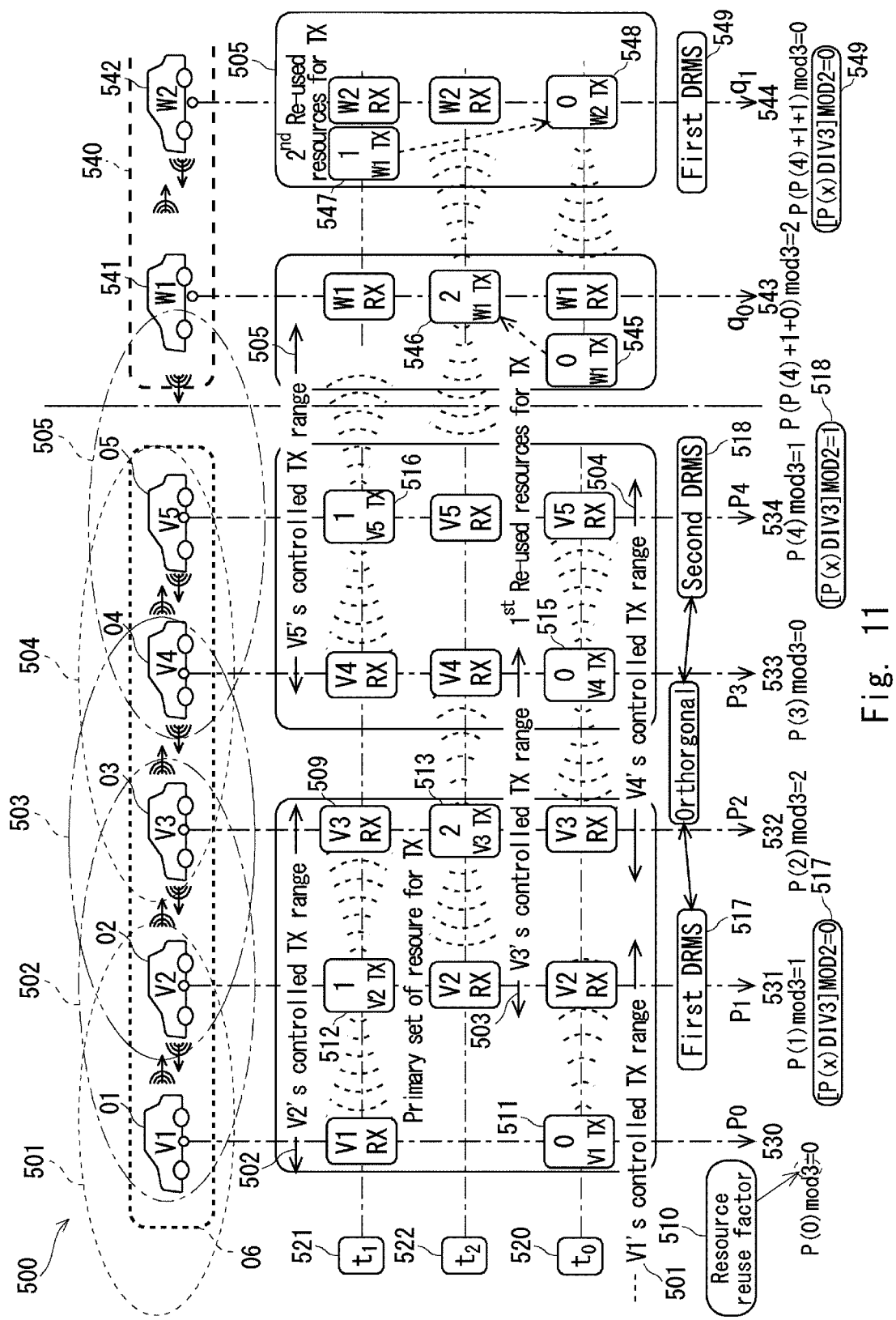
FIG. 11 is exemplary TX range control assisting the optimised resource reservation for secure intra-platoon communication.

In reference to FIG. 11, the exemplary system (500) illustrates a platoon (e.g. 06) having five V2X-vehicles: V1 (e.g. 01), V2 (e.g. 02), V3 (e.g. 03), V4 (e.g. 04) and V5 (e.g. 05) being indexed as P(0) (e.g. 530), P(1) (e.g. 531), P(2) (e.g. 532), P(3) (e.g. 533), and P(4) (e.g. 534) respectively. V1 (e.g. 01) is the platoon leader and the 'TX range control' feature is enable to assist the V2X-vehicles (e.g. 01, 02, 03, 04, and 05) in the platoon (e.g. 06) to maintain their desirable TX range (e.g. 501, 502, 503, 504, and 505). With the configured "Platooning resource reuse factor" value of 3 (e.g. 510), the set of 3 selected resources {0 (e.g. 511); 1 (e.g. 512); 2 (e.g. 513)} are selected and then reserved for an intra-platoon communication transmission by each V2X-vehicle in the platoon. Since the (V2X-vehicle (01)'s index mod 3) and (V2X-vehicle (04)'s index mod 3) are equal to '0', both V2X-vehicle (01) and V2X-vehicle (04) can share the same channel resource '0' (e.g. 511 & 516) for concurrent transmission, where the V2X-vehicle (01) may use the first DMRS (e.g. 517), and the V2X-vehicle (04) may use the second DMRS (e.g. 518). With this configuration, on resource channel '0', the V2X vehicles (02) and (03) can receive data from their neighbouring V2X vehicles (01) and (04) on the first and second DMRS respectively while performing residual TX power from the V2X vehicles (04) and (01) on the second and first DMRS respectively as part of TX range control protocol described previously. The similar discussion is applied for V2X vehicles (02) and (05) on the shared channel resource '1'.

Having discussed and exemplarily illustrated the method in using the configurable 'resource reuse factor' to control the number of resources or sub-channels being allocated for sharing among V2X-vehicles within a platoon in intra-platooning communication, in a resource pool for V2X-communication of different types, a primary set of indexed sub-channels or resources can be determined or predetermined and then reserved at regular interval for intra-platoon communication. In order to protect the primary set of indexed sub-channels from other non-platooning V2X communication (i.e. second type V2X-communication), the indexes of the sub-channels in the primary set can be masked off the list of available sub-channels for selection. The mask can be preconfigured or configured for use at a V2X-Vehicles.

To facilitate the lateral coexistence of multiple platoons, one or more secondary sets of indexed sub-channels or resources can be determined or predetermined and then reserved for use when in needs. Otherwise, the indexed sub-channels in the secondary set(s) may be made available for use by the second type of V2X communication. Furthermore, the number of secondary sets can be configured or preconfigured depending on defined geographic zones.

In the condition where there is no laterally existing platoon within proximity, by default the primary set of indexed sub-channels is selected/reselected or configured/reconfigured for use in intra-platoon communication at an establishing platoon or at a platoon where a secondary set of indexed sub-channels was selected or configured for temporary use. With the primary set of indexed sub-channels being used for intra-platoon communication, when approaching another platoon from behind, and the longitudinally coexistent platoons topology (such as platoons concatenation) can be maintained for a period of time, the platoon leader may need to adjust its index and its member indexes so that the primary set of indexed sub-channels can be continually used for intra-platoon communication within its platoon without the risk of causing interference to the platoon that it is approaching. The indexes adjustment will lead to the concurrent reselection of sub-channels and/or DMRS set for transmission/reception at each member in its platoon. The concept of resource reuse though index adjustment is further illustrated in FIG. 11.

In reference to FIG. 11, the platoon (e.g. 540), having platoon leader (e.g. 541) and one or more platoon members (e.g. 542s), may approach another platoon (e.g. 06) which is discovered via the first type of V2X-communication. Via the second type of V2X communication, the platoon leader (e.g. 541) may exchange its driving intention with the V2X-vehicle (05) for further synchronised driving such as platoon concatenation for further fuel saving. In order to eliminate the risk that its intra-platoon communication may cause interference to the platoon (06)'s intra-communication, the platoon leader (541) may obtain the V2X-vehicle (05)'s platoon member index (i.e. 4) which will be used as baseline index for adjusting its index (0→5; 543) and its member's index (1→6; 544). The index adjustment will lead to sub-channels and DMRS set reselection at the V2X-vehicle (541) [e.g. from sub-channel '0' (545) to sub-channel '2' (546); and from 1st DMRS to second DMRS for transmission]. Index adjustment will lead to sub-channels at the V2X-vehicle (542) [e.g. from sub-channel '1' (547) to sub-channel '0' (548); and keeping first DMRS (549) for transmission].

To add additional privacy and security to intra-platoon communication—the third type of V2X communication, the following applies:

Platoon member destination ID—3-bit value is included the scheduling SCI;

Control channel (i.e. PSCCH) for intra-platoon communication—in the step of CRC attachment, the generated CRC is scrambled or masked by '8-bits Platoon ID' (i.e. $n_{ID}^{Platoon}$)). So that only platoon members with the same platoon-ID can detected the intra-platoon communication SCI; and Data channel (i.e. PSSCH) for intra-platoon communication—the block of bits to be transmitted on the physical sidelink shared channel in the reserved channel resource within one slot, shall be scrambled with a Platoon specific scrambling sequence prior to modulation. The scrambling sequence generator shall be initialised with $n_{ID}^{X} \cdot 2^{14} + n_{sslot}^{PSSCH} \cdot 2^9 + 510$ at the start of every PSSCH slot, with with $N_{ID}^{X} = n_{ID}^{Platoon}$ This scrambling will make the data channel on the intra-platoon communication resource look like noise to other V2X-vehicles sharing the same second V2X-resource pool.

The foregoing embodiments are novel and provide:

1. The scalable integrated logical resource pool structure for vehicular communication in progressively realising automated driving applications meeting SAE's guideline, and method for configuring the integrated logical resource pool in 5G-V2X system;

2. 'Channel reservation for reverse transmission' method for use in realising closed loop communication for exchanging data such as driving coordination data for time-sensitive decision-making where message round trip time can be guaranteed;

3. TX range control method for use in intra-platoon communication which is in turn enable the introduction of configurable resource reuse, where a set of sub-channels can be predetermined or determined and further protected for intra-platoon communication regardless of platoon size (i.e. number of platoon members) and number of coexisting active platoons;

4. PSCCH and PSSCH channel coding structure where 'Platoon ID' is used as inputs for PSCCH CRC masking and for PSSCH scrambling to further improve the privacy and security in intra-platoon communication.

The advantages are as follows:

1. A scalable integrated resource pool where V2X terminals can utilise different waveforms in sharing different types of automated driving application data and exchanging time sensitive coordination data assisting the progressive development of automated driving applications;

2. Physical layer or layer 1 assisted "ask-response' protocol where the requesting V2X-terminal can control the resources and latency for transmitting and receiving the expected response hence eliminating the dependency on the requested V2X-Vehicle in selecting and reserving resources for response. Thus, low and guaranteed latency closed loop communication can be realised;

3. Intra-platoon communication method, where resources can be efficiently allocated/controlled and further protected from channel collision/interference and signal perception/interception. The method eliminates the redundancies where every platoon members in a platoon independently select resources and reserve the selected resources for their transmissions. The redundancies will increase with number of formed/forming platoons, which potentially causes the shortage of resources for other short distance grouping V2X-communications, and inter platoon channel collisions.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

For example, the whole or part of the exemplary embodiments disclosed above can be described as, but not limited to, the following supplementary notes.

(Supplementary Note 1)

A method of configuring an integrated resource pool for use in an advanced wireless communication system such as 5G (the Fifth Generation) system, the system comprising a plurality of vehicles having capabilities of including but not being limited to one or multiples of the following:

sharing status data, sensor data, and intention data for awareness driving, sensing driving and cooperative driving applications;

exchanging time-sensitive coordination data for synchronised cooperative driving; and establishing highly secured wireless communication for exchanging time-sensitive coordination data and conveying time-sensitive management data in dynamic platooning or on inter-platoon communication;

the method comprising:

configuring a first logical resource pool dedicated for V2X sidelink communication, or open loop communication, in sharing driving related application data including but not being limited to status data, sensor data, and intention data;

configuring a second logical resource pool dedicated for V2X sidelink communication, or closed-loop communication, in sharing time-sensitive coordination data and/or exchanging time-sensitive coordination data in short distance grouping such as synchronised coordination driving and long distance grouping such as platooning; and configuring one primary set of resources and one or more secondary sets of resources from the second logical resource pool for secured intra-platoon communications.

(Supplementary Note 2)

The method according to note 1, wherein the first and second logical resource pools are configured or preconfigured to share the same BWP (bandwidth part).

(Supplementary Note 3)

The method according to note 2, where slots selected to form the first resource pool and slots selected to form the second resource pool are time-multiplexed in comb format where multiple second logical resource pool slots are interleaved between any two consecutive slots of the first logical resource pool.

(Supplementary Note 4)

The method according to note 3, where the first resource pool's slots and the second resource pool's slots may be further configured with different numerologies for V2X-SL signal transmission or reception.

(Supplementary Note 5)

The method according to note 4, where the length of first resource pool's slot may be equal to multiple lengths of the second resource pool's slot.

(Supplementary Note 6)

The method according to note 2, where the first and second logical resource pools are alternatively configured or preconfigured on separated BWPs.

(Supplementary Note 7)

The method according to note 6, where the BWP having first logical resource pool and the BWP having second logical resource pool are adjacent BWPs.

(Supplementary Note 8)

The method according to note 1, where resources in the primary set and secondary sets are predetermined or selected indexed sub-channels in the second resource pool.

(Supplementary Note 9)

The method according to note 8, where sub-channel indexes in the primary set and sub-channel indexes in one or more secondary sets are masked off the list of available sub-channels for sensing and selection to provide protection for intra-platoon communications.

(Supplementary Note 10)

A method of channel reservation for reverse transmission performed by a first V2X terminal and one or more second V2X terminals in proximity realising closed-loop communication in exchanging data, such as driving coordination data for time-sensitive decision-making at the first V2X terminal, the method comprising:

10.1. at the first V2X terminal, determining a number of sub-channels and a number of consecutive forward transmissions for successful conveying a message to one or more intended second V2X terminals;

10.2. at the first V2X terminal, further determining a number of consecutive reverse transmissions for an intended second V2X terminal to successful convey the response message intended to the first V2X terminal;

10.3. at the first V2X terminal, performing sub-channels selection and reservation of selected sub-channels for the number of consecutive transmissions identified in steps 10.1 and 10.2;

10.4. at the first V2X terminal, on a current transmission, indicating whether the next transmission on the selected sub-channel(s) is reserved for its forward transmission or for reverse transmissions from the intended V2X terminal;

10.5. at the second V2X terminal, upon the detection of the indication channel reservation from the first V2X terminal in the last reception, performing transmission according to granted channel reservation information; and 10.6. at the second V2X terminal, on the current transmission using sub-channel(s) granted by the first V2X terminal, indicating the number of remaining transmissions that use channel reservation by the first V2X terminal.

(Supplementary Note 11)

The method according to note 10, wherein the 3GPP LTE Rel'14/15 sensing-based SPS scheme is used as baseline, at the first V2X Vehicle, in selecting sub-channels for forward transmissions and reverse transmissions.

(Supplementary Note 12)

The method according to note 10, where layer 1 signalling is used, at the first V2X terminal, to indicate whether the next transmission on the selected sub-channel(s) is reserved for its forward transmission or for reverse transmissions from the intended second V2X terminal.

(Supplementary Note 13)

The method according to note 12, where 2-bits in a SCI at the first V2X-Vehicle is used to indicate if the next transmission on the selected sub-channel(s) is reserved for reverse transmission and number of consecutive reserve transmissions in the range [1 to 3] from the intended V2X terminal.

(Supplementary Note 14)

The method according to note 10 or note 12, where 2-bits in a SCI at the second V2X-Vehicle is used to indicate the remaining number of consecutive reserve transmissions in the range [1 to 2] from the V2X terminal.

(Supplementary Note 15)

The method according to note 13 or note 14, where the value of the 2-bits in the SCI is provided by a high layer such as MAC-CE.

(Supplementary Note 16)

A method for use in an advanced wireless communication system such as 5G (the Fifth Generation) system, to configure dynamic-platooning capable V2X terminals for highly secured intra-platoon communication where the resources will be utilised and reused, the method comprising:

16.1. configuring or preconfiguring 'Platooning TX range' Information element (IE), indicating whether the transmission range control feature is enabled or disabled for intra-platoon communication;

16.2. configuring or preconfiguring the 'Platooning resource reuse factor K' IE, indicating maximum 'K' number of non-overlapping resources, per primary resource set or secondary resource set, being allowed for one transmission occurrence at every platoon member in a platoon or virtually concatenated platoons or longitudinal aligned platoons regardless number of platoons' members;

16.3. configuring or preconfiguring the 'DMRS offset' IE, for use in identifying the second DMRS orthogonal sequence for use in alternated with the given first DMRS orthogonal sequence, on every second resource reuse;

16.4. configuring or preconfiguring the 'platooning resource set periodicity' IE, indicating the periodic occurrence of the resource sets within the second logical resource pool;

16.5. at a platoon member, on the selected or assigned resource or sub-channels within the resource set for transmission, transmitting control channel (i.e. PSCCH) which is intended to neighbouring platoon member(s) and detectable by all platoon members;

16.6. at the said platoon member, on the said selected or assigned resource or sub-channels within the resource set for transmission, transmitting associated shared channel (i.e. PSSCH) which is only decodable at all platoon member(s);

16.7. at a platoon member, on the remaining resources or sub-channels within the resource set which are not selected or assigned for transmission, monitoring control channels (i.e. PSCCHs) for intended SCI; and upon successful detection of an intended SCI, performing the reception and decoding of the associated shared channel (i.e. PSSCHs); and 16.8. at said platoon member, on the resources or sub-channels within the resource set which are not selected or assigned for transmission, and intended SCI is detected, performing the residual TX power measurement using the alternated DMRS sequence.

(Supplementary Note 17)

The method according to note 16, where the Platooning resource reuse factor K is configured or preconfigured to have value≥3, and 3 is the default value.

(Supplementary Note 18)

The method according to note 17, where the Platooning resource reuse factor K is further used to imply the transmission range (K−1) in number of consecutive V2X-vehicles longitudinally.

(Supplementary Note 19)

The method according to note 17, wherein a platoon of N members is indexed from 0 to N−1, N>K, the V2X terminals on two or more platoon members with indexes 'n' and 'm', that satisfy (n MOD K)=(m MOD K), share the same resource or sub-channels within a resource set for transmitting data to their neighbouring platoon members.

(Supplementary Note 20)

The method according to note 19, wherein V2X terminals on two or more platoon members that share the same resource or sub-channels for data transmission to their neighbouring platoon members concurrently, will alternately use first and second orthogonal sequences.

(Supplementary Note 21)

The method according to note 20, wherein using the first or second orthogonal sequence in receiving data from its neighbouring platoon members, the V2X terminal on a platoon member will simultaneously use the second or first orthogonal sequence as a reference signal for measuring residual TX power from other platoon members.

(Supplementary Note 22)

The method according to note 21, wherein DMRS offset=2 is configured or preconfigured, possible ones of the first and corresponding second DMRS sequences being specified in the table below:

| Sequence Index | Orthogonal sequences first sequences-DMRS | Orthogonal sequences Second sequences-DMRS |
| --- | --- | --- |
| 0 | [+1 +1 +1 +1] | [+1 +1 −1 −1] |
| 1 | [+1 −1 +1 −1] | [+1 −1 −1 +1] |

-continued

| Sequence Index | Orthogonal sequences first sequences-DMRS | Orthogonal sequences Second sequences-DMRS |
|---|---|---|
| 2 | [+1 +1 −1 −1] | [+1 +1 +1 +1] |
| 3 | [+1 −1 −1 +1] | [+1 −1 +1 −1] |

(Supplementary Note 23)

The method according to note 16, where Platoon member destination ID, 3-bit value, is included in the scheduling SCI which is transmitted on a control channel (i.e. PSCCH).

(Supplementary Note 24)

The method according to note 16 or note 23, wherein Control channel PSCCH for intra-platoon communication involves a step of CRC attachment, a generated CRC being scrambled or masked by '8-bits Platoon ID' ($n_{ID}^{Platoon}$), so that only platoon members with the same platoon-ID can detected the intra-platoon communication SCI.

(Supplementary Note 25)

The method according to note 24, where Platoon ID ($n_{ID}^{Platoon}$) is configured by the network for use in a platoon or derived by the platoon leader and configured for use at platoon members.

(Supplementary Note 26)

The method according to note 16 or note 25, wherein Platoon ID ($n_{ID}^{Platoon}$) is further used in generating scrambling sequence for use on PSSCHs scrambling, making the intra-platoon shared channels look like noise to other V2X-vehicles sharing the same second V2X-resource-pool.

(Supplementary Note 27)

The method according to note 26, where Platoon ID ($n_{ID}^{Platoon}$) is used as input for scrambling a sequence generator initialisation per expression $c_{init}=n_{ID}^{X} \cdot 2^{14} + n_{sslot}^{PSSCH} \cdot 2^{9} + 510$, and at the start of every PSSCH slot, with $n_{ID}^{X}=n_{ID}^{Platoon}$.

This application is based upon and claims the benefit of priority from Australian provisional patent application No. 2018903021, filed on Aug. 17, 2018, the disclosure of which is incorporated herein in its entirety by reference.

REFERENCE SIGNS LIST 01,02,03,04,05 vehicles
06 platoon
11 first type of V2X communication
12 second type of V2X communication
15 third type of V2X communication
20 platoons concatenation
21 platoon
22,23,24,26 V2X vehicle
25 platoon
31 traffic light controller (RSU)
32 V2X communication links
34 merge right
100 resource pool structure
101 SAE applications
102,103 resource pools
120 third type of V2X communication
130 second type of V2X communication
131,132,133,134,135,137,139 transmission
136 periodicity
150 exemplary structure
151,152 BWP
200 system
201,202,203,204,205 sub-channels
300 dynamic TX range control protocol
311,322,332 sub-channel
501,502,503,504,505 desirable TX range
540 platoon
541 platoon leader
542 V2X-vehicle
712 incoming period
713,715 reverse transmission
714 forward transmission

What is claimed is:

1. A method of channel reservation for reverse transmission performed by a first V2X terminal and one or more second V2X terminals in proximity realizing closed-loop communication in exchanging data, including driving coordination data for time-sensitive decision-making at the first V2X terminal, the method comprising:
at the first V2X terminal, determining a number of sub-channels and a number of consecutive forward transmissions for successful conveying a message to one or more intended second V2X terminals;
at the first V2X terminal, further determining a number of consecutive reverse transmissions for an intended second V2X terminal to successful convey a response message intended to the first V2X terminal;
at the first V2X terminal, performing sub-channels selection and reservation of selected sub-channels for the number of determined consecutive forward transmissions and consecutive reverse transmission;
at the first V2X terminal, on a current transmission, indicating whether the next transmission on the selected sub-channel(s) is reserved for its forward transmission or for reverse transmissions from the intended second V2X terminal;
at the intended second V2X terminal, upon the detection of the indication sub-channel reservation from the first V2X terminal in the last reception, performing transmission according to granted sub-channel reservation information; and
at the intended second V2X terminal, on the current transmission using sub-channel(s) granted by the first V2X terminal, indicating the number of remaining transmissions that use sub-channel reservation by the first V2X terminal.

2. The method according to claim 1, where layer 1 signaling is used, at the first V2X terminal, to indicate whether the next transmission on the selected sub-channel(s) is reserved for its forward transmission or for reverse transmissions from the intended second V2X terminal.

3. The method according to claim 2, where 2-bits in a SCI at the first V2Xterminal is used to indicate if the next transmission on the selected sub-channel(s) is reserved for reverse transmission and number of consecutive reserve transmissions in the range [1 to 3] from the intended second V2X terminal.

4. The method according to claim 1, where 2-bits in a SCI at the second intended V2Xterminal is used to indicate the remaining number of consecutive reserve transmissions in the range [1 to 2] from the intended second V2X terminal.

5. A V2X terminal configured to perform sub-channel reservation for reverse transmission:
wherein the V2X terminal, when in proximity with one or more second V2X terminals, realizes closed-loop communication in exchanging data;
wherein the V2X terminal determines a number of sub-channels and a number of consecutive forward transmissions for successful conveying a message to one or more intended second V2X terminals;

wherein the V2X terminal determines a number of consecutive reverse transmissions for an intended second V2X terminal to successful convey a response message intended to the second V2X terminal;

wherein the V2X terminal performs sub-channels selection and reservation of selected sub-channels for the number of determined consecutive forward transmissions and consecutive reverse transmission; and wherein the V2X terminal, on a current transmission, indicating whether the next transmission on the selected sub-channel(s) is reserved for its forward transmission or for reverse transmissions from the intended second V2X terminal.

\* \* \* \* \*